US008786612B2

(12) United States Patent  
Toyooka et al.

(10) Patent No.: US 8,786,612 B2  
(45) Date of Patent: Jul. 22, 2014

(54) ANIMATION EDITING DEVICE, ANIMATION PLAYBACK DEVICE AND ANIMATION EDITING METHOD

(75) Inventors: Akira Toyooka, Tokyo (JP); Hiroki Konaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 13/146,660

(22) PCT Filed: Mar. 31, 2009

(86) PCT No.: PCT/JP2009/001497  
§ 371 (c)(1),  
(2), (4) Date: Jul. 28, 2011

(87) PCT Pub. No.: WO2010/113211  
PCT Pub. Date: Oct. 7, 2010

(65) Prior Publication Data  
US 2011/0298809 A1 Dec. 8, 2011

(51) Int. Cl.  
*G06T 15/00* (2011.01)  
*G06T 11/00* (2006.01)  
*A63F 13/10* (2006.01)

(52) U.S. Cl.  
CPC .................. *G06T 11/00* (2013.01); *A63F 13/10* (2013.01)  
USPC ........... 345/473; 345/441; 345/474; 345/475; 382/309

(58) Field of Classification Search  
CPC .................................. G06T 11/60; A63F 13/00  
USPC .................. 345/473, 474, 475, 441; 382/309  
See application file for complete search history.

(56) References Cited

U.S. PATENT DOCUMENTS

| | | | |
|---|---|---|---|
| 5,926,186 A | 7/1999 | Itoh et al. | |
| 6,310,622 B1 * | 10/2001 | Asente | 345/441 |
| 7,990,385 B2 * | 8/2011 | Kake et al. | 345/473 |
| 8,170,380 B1 * | 5/2012 | Gilra | 382/309 |

FOREIGN PATENT DOCUMENTS

| | | |
|---|---|---|
| JP | 6 96186 | 4/1994 |
| JP | 9 35083 | 2/1997 |
| JP | 2007 122265 | 5/2007 |

OTHER PUBLICATIONS

Office Action issued Mar. 17, 2014 in German Patent Application No. 112009004615.0 with English-language Translation, 19 pages.  
"Mathematica"-Online-Tutorial on topic "Introduction to Manipulate". Wolfram Research, available in Internet on Dec. 3, 2008.  
International Search Report issued May 12, 2009 in PCT/JP09/001497 filed Mar. 31, 2009.

* cited by examiner

*Primary Examiner* — Phu K Nguyen  
(74) *Attorney, Agent, or Firm* — Oblon, Spivak, McClelland, Maier & Neustadt, L.L.P.

(57) ABSTRACT

An animation editing device includes animation data including time line data that defines frames on the basis of a time line showing temporal display order of the frames, and space line data that defines frames on the basis of a space line for showing a relative positional relationship between a display position of each of animation parts and a reference position shown by a tag by mapping the relative positional relationship onto a one-dimensional straight line, displays the time line and the space line, and the contents of the frames based on the time line and the space line, and accepts an editing command to perform an editing process according to the inputted editing command.

10 Claims, 19 Drawing Sheets

FIG.10
(a)
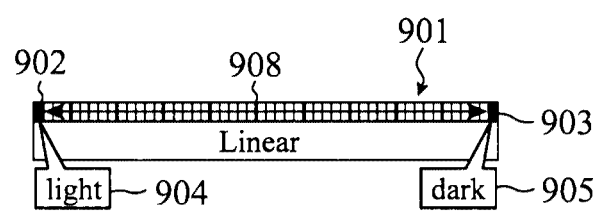
(b)
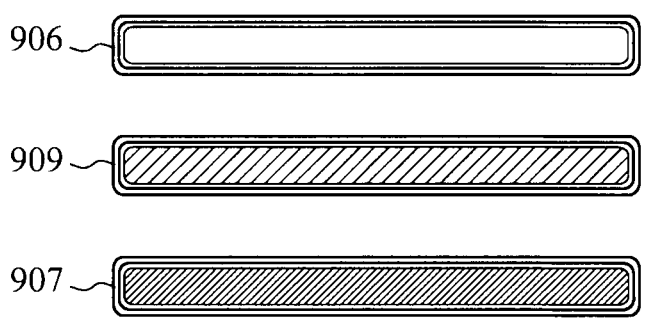

| Key Frame | |
|---|---|
| Key Frame ID | Data of Key Frame |
| frame0 | Data of Frame0 111<br>Tag Arrangement Data |
| frame1 | Data of Frame1 111<br>Tag Arrangement Data |
| frame2 | Data of Frame2 111<br>Tag Arrangement Data |
| ... | ... |

(b)

| Part Name | Part Type | Part Specific Data |
|---|---|---|
| image0 | Image | X30, Y40, W80, H80, Data Sequence ... |
| anim1 | Animation Data | X0, Y90, W100, H50, Data Sequence ... |
| tag0 | Tag | X50, Y115, Name "light" |
| tag1 | Tag | X50, Y185, Name "dark" |
| ... | ... | ... |

~111

Interpolation Setting Data (112)

| Key Frame ID | Part Name | Property | Interpolation Method |
|---|---|---|---|
| frame0 | anim1 | Y | Linear Interpolation |
| frame1 | anim2 | Y | Linear Interpolation |
| frame1 | anim2 | W | Linear Interpolation |
| ... | ... | ... | ... |

FIG.19
(a)
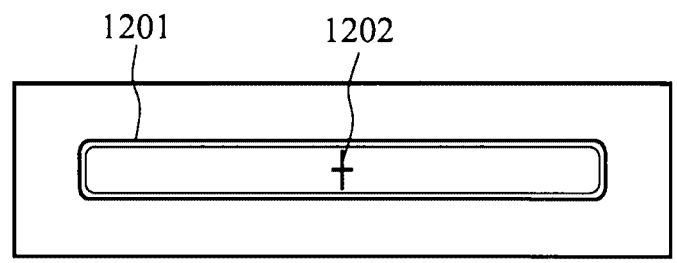
(b)
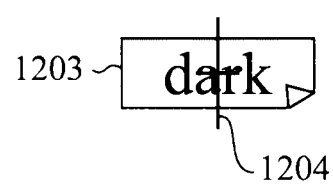

FIG.20
(a)
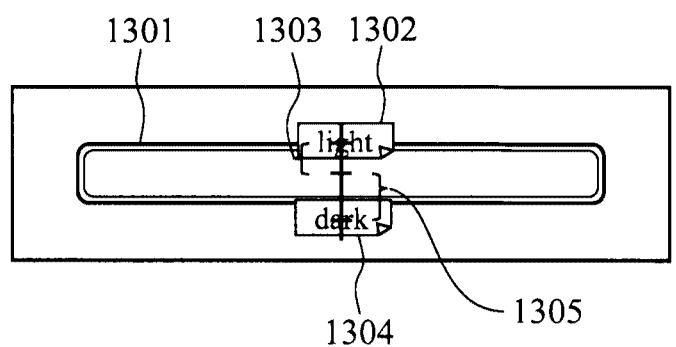
(b)
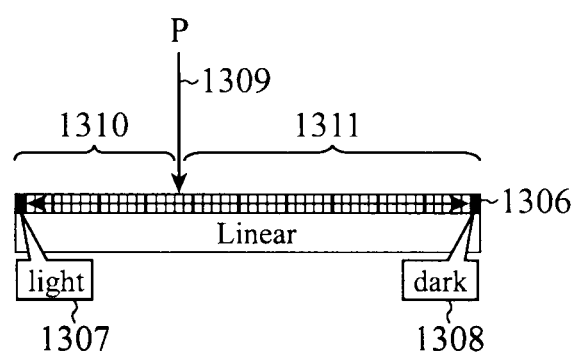

ANIMATION EDITING DEVICE, ANIMATION PLAYBACK DEVICE AND ANIMATION EDITING METHOD

FIELD OF THE INVENTION

The present invention relates to an animation editing device for creating a user interface or a movie content which uses an animation by using an animation description model based on interpolation of fames between key frames, an animation playback device for playing back the animation and an animation editing method.

BACKGROUND OF THE INVENTION

Conventionally, each of screen states at plural times on a time line, which are reference points of an animation, is defined as a key frame. A screen state means the display positions and display states of parts (objects) which construct the screen. A conventional animation editing device creates an animation by defining a method of interpolating the display positions and display states of parts which vary with time between key frames (parts arranged in each key frame).

Furthermore, patent reference 1 discloses an animation editing technology of specially bringing each key frame into correspondence with a symbol showing time abstractly without directly bringing each key frame into correspondence with time, thereby separating the editing of each key frame from the editing of the time to improve the efficiency of the animation editing process.

[Patent reference 1] JP,2007-122265,A (see pages 3 to 4)

However, in the conventional animation editing device, both a change in the display position of each part and a change in the display state of each part are defined with reference to the display time on the time line. Therefore, when an editor desires to change the display state (the display color or the like) of a part according to the display position of the part, the editor needs to bring a desired display position and a desired display state into correspondence with an identical time on the time line, and has to carryout editing of key frames and editing of times simultaneously. A problem is therefore that the editing process becomes complicated.

Furthermore, in the conventional animation editing process, in order for the editor to check the display position and display state of each part in the animation created during the editing process, the editor needs to cause the conventional animation editing device to display the key frames one by one. A problem is therefore that the conventional animation editing device is inferior in at-a-glance visibility. This problem similarly arises in the animation editing technology according to the invention disclosed by patent reference 1 of showing a time with an abstract symbol, thereby improving the efficiency of the editing process.

The present invention is made in order to solve the above-mentioned problems, and it is therefore an object of the present invention to provide an animation editing device which enables an editor to edit an animation while easily bringing part positions on the screen into correspondence with the display states of the parts at the positions and enables the part positions on the screen into correspondence with the display states of the parts at the positions and enables the editor to easily understand the correspondence between the positions and the display states also from the edit results, an animation playback device which plays back the animation, and an animation editing method.

DESCRIPTION OF THE INVENTION

An animation editing device in accordance with the present invention includes: a data storage unit for storing animation data including space line data in which a layout of key frames which serve as references of an animation, arrangement of tags in each of the key frames and information about interpolation of frames between the key frames are defined on a basis of a space line for showing a relative positional relationship between a display position of each of animation parts and a reference position shown by a tag by mapping the relative positional relationship onto a one-dimensional straight line; a tag editing unit for setting a tag at a position on the space line defined by the space line data read from the data storage unit according to an inputted editing command, the position being shown by the editing command; a tag arranging unit for arranging a tag at a position of a key frame defined by the animation data according to an inputted editing command, the position being shown by the editing command; and an animation editing management unit for providing the space line which is defined by the space line data included in the animation data to be edited read from the data storage unit, and contents of the frames based on the space line, and accepting an editing command, and for causing a space line editing unit, the tag editing unit, and the tag arranging unit to perform an editing process according to an editing command which is inputted as a response to the provided information to provide an animation edit result.

As mentioned above, the animation editing device in accordance with the present invention includes the data storage unit for storing the animation data including the space line data in which a layout of the key frames which serve as references of an animation, arrangement of tags in each of the key frames and information about interpolation of frames between the key frames are defined on the basis of the space line, and provides the space line which is defined by the space line data included in the animation data to be edited read from the data storage unit, and the contents of the frames based on the space line, accepts an editing command, and carries out one of space line editing, tag editing, and tag arrangement according to an editing command which is inputted as a response to the displayed information. Because by doing in this way, the animation editing device in accordance with the present invention can edit the animation while easily bringing any animation image position on the display screen into correspondence with the display state at the position, the animation editing device can provide an improvement in the animation editing efficiency. Furthermore, the animation editing device in accordance with the present invention provides a remarkable advantage of enabling an editor to easily grasp the correspondence between the positions of animation parts and their display states from the arrangement of tags in the frames and also from the animation edit result, the advantage being not provided by any conventional animation editing device.

BRIEF DESCRIPTION OF THE FIGURES

FIG. 10 is a view showing a concrete example of the space line editing process;

FIG. 14 is a view showing an example of the data structure of key frame data;

FIG. 19 is a view showing an example of the reference points at the time of defining a position on the screen;

FIG. 20 is a view showing a general description of a process of determining the display position of a part on a space line from a positional relationship between the part and a tag;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
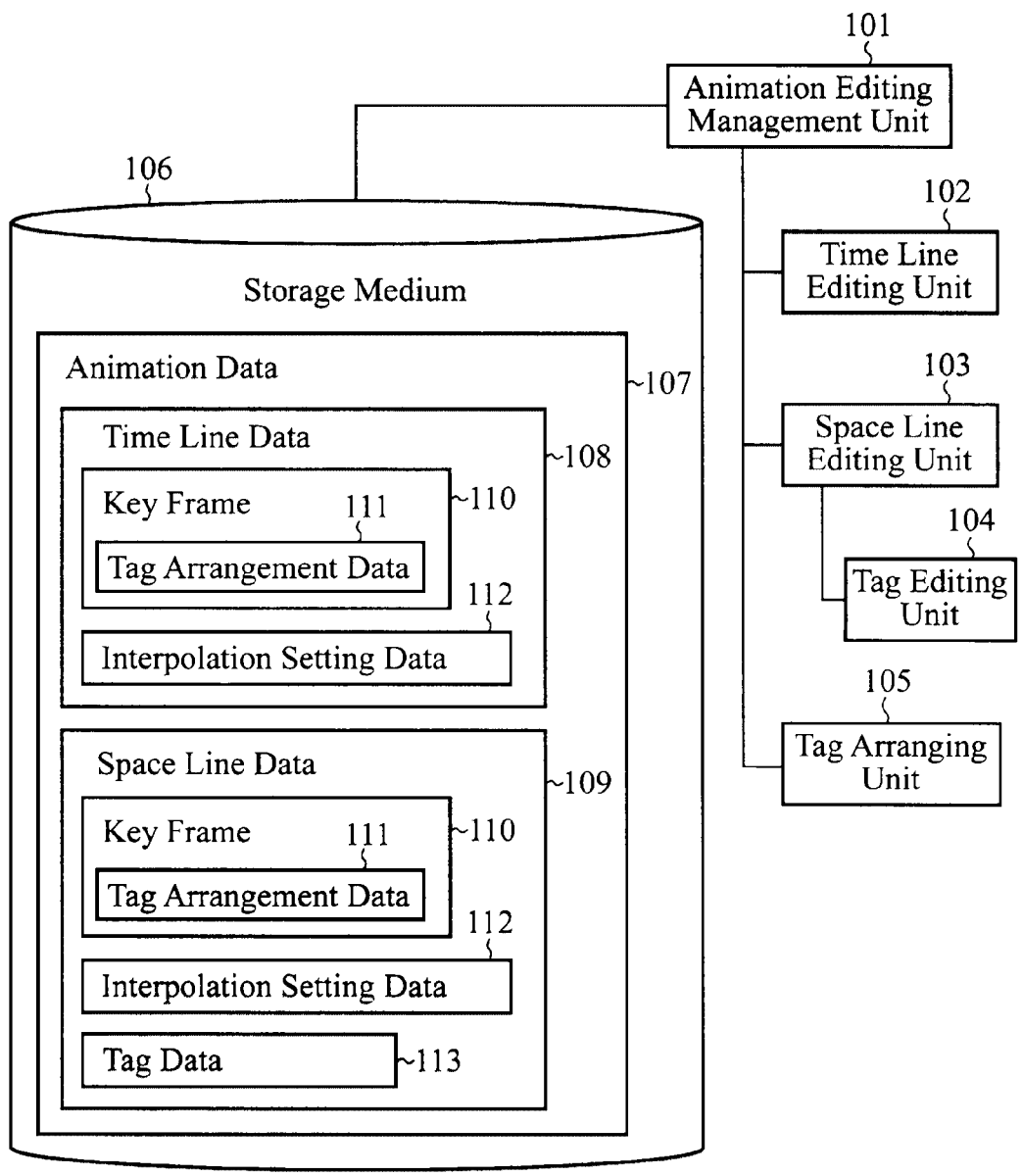
FIG. 1 is a block diagram showing the structure of an animation editing device in accordance with Embodiment 1 of the present invention.

FIG. 1 is a block diagram showing the structure of an animation editing device in accordance with Embodiment 1 of the present invention. In FIG. 1, an animation editing management unit 101 reads and writes animation data from and into a storage medium 106, receives an editing command from an editor (user), and provides edit results for the editor. The animation editing management unit uses an input device (not shown), such as a keyboard or a mouse, to receive an editing command.

The animation editing management unit also uses an output device (not shown), such as a display or a speaker, to output edit results.

A time line editing unit 102 creates a key frame, arranges a part in the key frame, arranges the key frame on a time line (time-axis) showing a temporal display order of frames, and sets information about interpolation of part positions and part display states between key frames according to an editing command. As an example of the information about interpolation, how to change the display position and display state of each part arranged in each key frame between key frames with time is set. For example, in a case of changing the display position of a part with a fixed amount of travel, linear interpolation based on this amount of travel is set as a piece of information about interpolation.

As a method of setting a key frame to the time line, the following methods can be provided, for example (only one or both of them can be used).

(A) A method of newly creating a key frame by selecting a position where the key frame is to be arranged from the time line (an empty frame or an interpolated frame).

(B) A method of newly creating a key frame which is not brought into correspondence with the time line to insert this key frame into a desired position on the time line (bring the key frame into correspondence with the desired position).

The time line is data in which a temporal relationship (a display time axis) among the frames which construct the animation is expressed. The temporal display order in which the frames which construct the animation are displayed with time is set to the time line, and frames specified through editing among these frames are arranged as key frames. More specifically, both key frames and interpolated frames are included in the frames.

A space line editing unit 103 creates a key frame, arranges a part in the key frame, arranges the key frame on a space line, and sets information about interpolation of part positions and part display states between key frames on the space line according to an editing command.

The space line is data in which a relative positional relationship between a reference position shown by a tag (arranged in a key frame of other animation data) and the display position of each animation part is mapped onto a one-dimensional straight line to show the relative positional relationship. The space line is basically used only for the animation data which are used as a part because the distance, which will be mentioned below in Embodiment 2, between the part having the space line and the tag defined by the part cannot be calculated unless the part and the tag are arranged in the same frame.

A tag editing unit 104 defines a tag at a specified position on the space line. For example, when receiving a command to arrange a tag in a predetermined frame on the space line displayed on a main operation screen via the animation editing management unit 101, the tag editing unit 104 sets the tag to a specified frame position according to this editing command.

A tag arranging unit 105 creates and arranges the tag at the specified position on the screen of the key frame. For example, the tag arranging unit creates the specified tag via the animation editing management unit 101, and arranges the tag at the specified position on the screen of the key frame. The tag arranging unit can alternatively arrange the tag on the screen of an arbitrary frame other than the key frame. Furthermore, the position of the tag can be made to move in the form of an animation, like those of other parts.

The tag arranged in the key frame is passed on to interpolated frames. As a result, when the interpolated frames are displayed in turn, it can be verified that the tag is arranged at the same position as that in the immediately preceding key frame.

A storage medium (data storage unit) 106 holds the animation data created by the animation editing management unit 101. The animation data 107 include time line data 108 and space line data 109 in addition to the data about each of the frames which construct the animation, as shown in FIG. 1.

The time line data 108 define each of the frames of the animation according to the time line edited by the time line editing unit 102, and have the key frames 110 and interpolation setting data 112.

The data about the key frames 110 are layout data about layout on a screen which serves as the key of the animation (a frame which serves as the key), and is constructed in such a way as to include tag arrangement data 111 showing tag arrangement. The tag arrangement data 111 show the arrangement of tags on the screen of the key frame. The interpolation setting data 112 show information about the interpolation of the part positions and part display states of parts between key frames.

The space line data 109 define each of the frames of the animation according to the space line edited by the space line editing unit 103, and have tag data 113 in addition to the key frames 110 and the interpolation setting data 112. The tag data 113 define the tags arranged on the space line.

Figure 2:
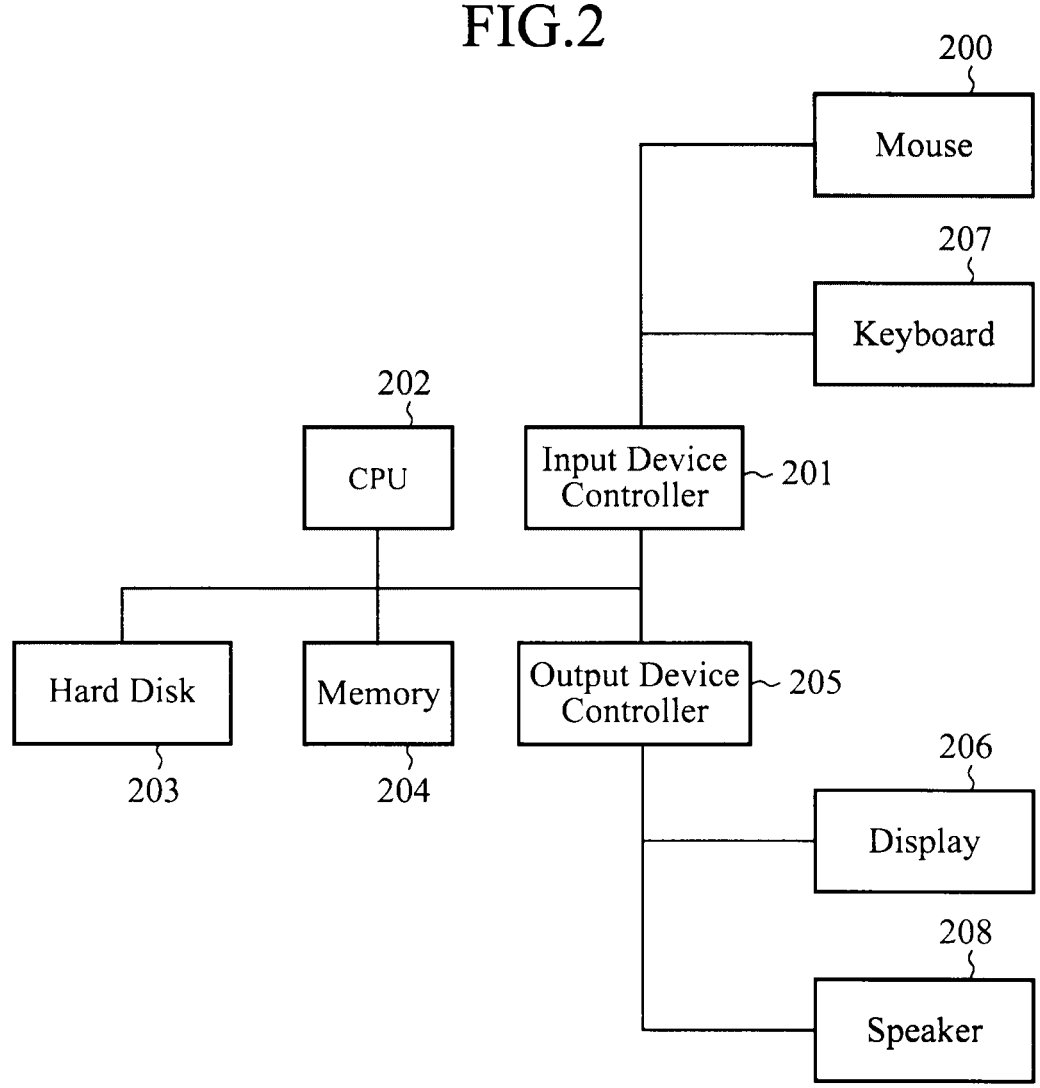
FIG. 2 is a view showing the hardware configuration of the animation editing device in accordance with Embodiment 1.

FIG. 2 is a view showing the hardware configuration of the animation editing device in accordance with Embodiment 1. The animation editing device in accordance with Embodiment 1 is constructed on a computer as shown in FIG. 2. More specifically, the animation editing management unit 101, the time line editing unit 102, the space line editing unit 103, the tag editing unit 104, and the tag arranging unit 105 can be implemented on the computer as concrete units in each of which hardware and software work in cooperation with each other by causing the above-mentioned computer to read a program for animation editing according to the scope of the present invention and then causing a CPU 202 to execute the program.

Furthermore, an output device controller 205 carries out a display of a command selection screen, edit results or the like and an audio output of edit results or the like via a display 206 and a speaker 208, and the editor is allowed to use an input unit, such as a mouse 200 or a keyboard 207 according to the above-mentioned display or audio output to cause the animation editing device to execute an editing command for the animation editing management unit 101, the time line editing unit 102, the space line editing unit 103, the tag editing unit 104, and the tag arranging unit 105 via an input device controller 201. In addition, the storage medium 106 can be constructed on a storage area of a hard disk 203 or a memory 204, which is normally built in the above-mentioned computer, or on a memory medium in an external storage device.

Next, the operation of the animation editing device will be explained.

(1) An Outline of the Operation

Figure 3:
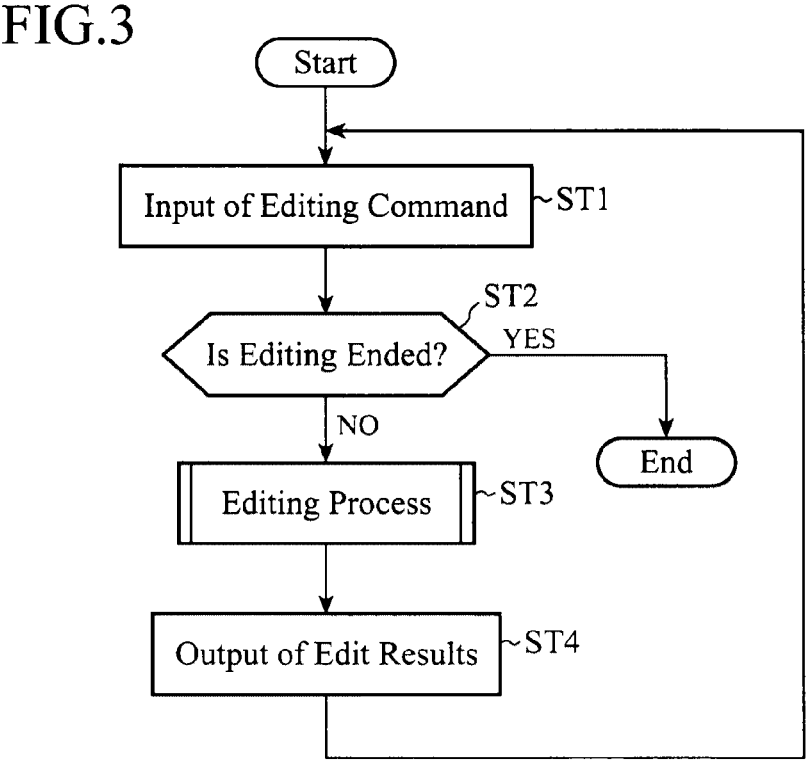
FIG. 3 is a flow chart showing the operation of the animation editing device in accordance with Embodiment 1.

FIG. 3 is a flow chart showing the operation of the animation editing device in accordance with Embodiment 1, and an animation editing operation will be explained with reference to this flow chart.

First, when the animation editing device starts, the animation editing management unit 101 is placed in an input waiting state in which the animation editing management unit accepts an editing command from outside the animation editing device. At this time, when an editor (user) inputs an editing command by using an input device, such as a keyboard or a mouse, the animation editing management unit 101 receives inputted editing command information (step ST1; editing command input step).

The animation editing management unit 101 then determines whether or not the command inputted in step ST1 is a command to end the editing (step ST2; editing end determination step). When the command is a command to end the editing (if YES in step ST2), the animation editing management unit ends the operation of the animation editing device.

In contrast, when the command is not a command to end the editing (if NO in step ST2), the animation editing management unit makes a transition to a process of step ST3.

The time line editing unit 102, the space line editing unit 103, the tag editing unit 104, and the tag arranging unit 105, in step ST3, perform an editing process of editing the animation data (operating the animation) according to the editing command information inputted thereto via the animation editing management unit 101 (step ST3; editing process step).

Figure 4:
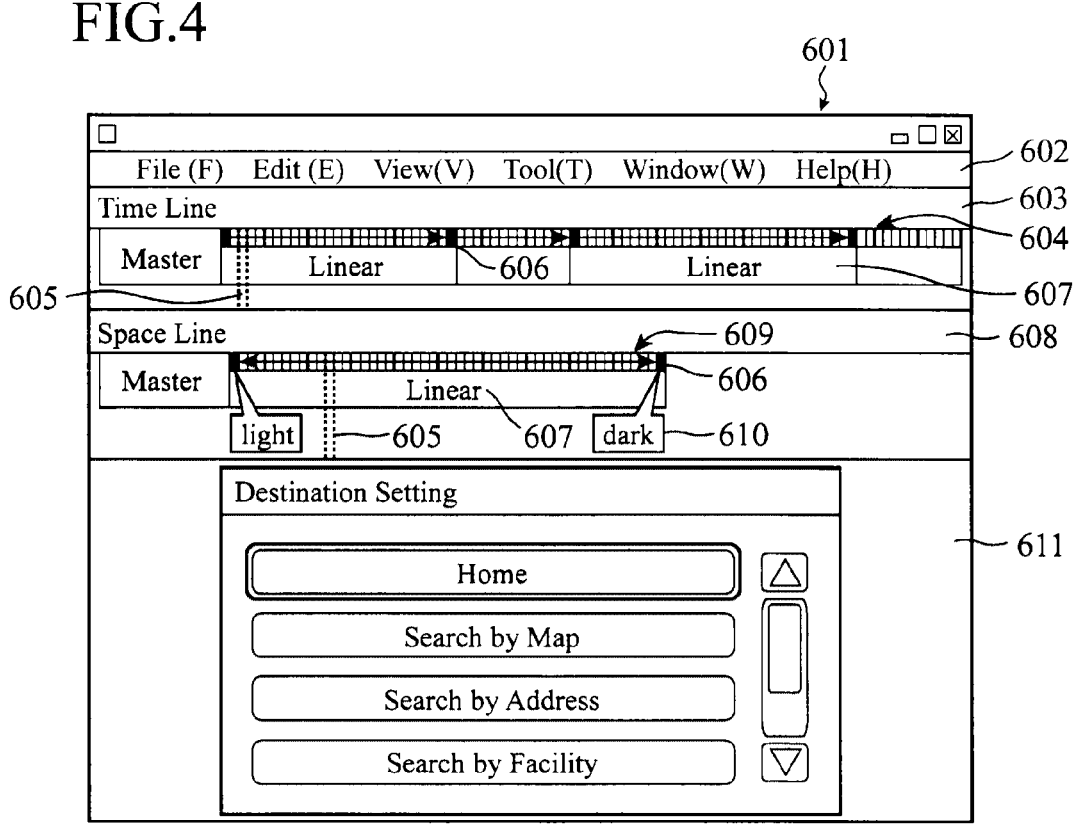
FIG. 4 is a view showing a main operation screen of the animation editing device in accordance with Embodiment 1.

FIG. 4 is a view showing a main operation screen of the animation editing device in accordance with Embodiment 1, and shows a UI (User Interface) provided by the animation editing management unit 101. In FIG. 4, the main operation screen 601 which is an animation editing window is a user interface which enables the editor to operate all the functions of the animation editing device in accordance with Embodiment 1.

When the animation editing device starts, the main operation screen 601 is displayed on the display screen of the display (not shown), and reception of the editing command inputted to the animation editing device in step ST1 and presentation of a process result from the animation editing device are carried out on this main operation screen 601.

In the main operation screen 601, edit menu items each for enabling the editor to select a standard file editing function (e.g., new creation or open of a file to be edited, storage of an edited file, copy and paste of data, or a display screen setting) to cause the animation editing device to perform the selected file editing function are displayed in a menu bar 602. When receiving an editing command, the animation editing device enables the user to select an item in the menu bar 602 by using the above-mentioned input device, and carries out an editing process corresponding to the selected item.

Information about the time line is displayed in a time line display area 603. The state of the time line of the animation data currently being edited is displayed in a time line 604. In the example of FIG. 4, a time axis in which the normal direction is left to right is provided as the time line 604, and one scale corresponds to one unit time. In the time line 604, frames in units of one unit time are arranged in time sequence on the above-mentioned time axis.

A display position cursor 605 shown by a dashed line in the time line 604 or a space line 609 shows a frame currently being displayed in the time line 604 or the space line 609. Furthermore, each key frame display 606 shown by a thick line in the time line 604 or the space line 609 shows a key frame arranged on the time line 604 or the space line 609. Each interpolation display 607 shows that the arrangement of parts and the state of display of the parts between the key frames shown by the corresponding key frame displays 606 are interpolated, and a method used for this interpolation. In the example of FIG. 4, linear interpolation is set as each interpolation.

The time line editing unit 102, in step ST3, edits the time line of the animation which is the target for edit process on the basis of the time line 604 displayed on the main operation screen 601 and according to the editing command to edit the time line inputted via the animation editing management unit 101. The editing process of editing the time line will be explained in detail with reference to FIG. 6 which will be mentioned below.

Information about the space line is displayed in a space line display area 608. The state of the space line of the animation data currently being edited is displayed in a space line 609. In the example of FIG. 4, different tags are arranged in two key frames in the space line 609, respectively, and an axis corresponding to the distance from each of the above-mentioned tags is provided so as to extend in a direction left to right.

Each of the tags 610 is an identifier showing an arbitrary position on the space line. A name is displayed in each of the tags, and each of the tags is identified by its name. In FIG. 4, a tag indicator having a tag name of "light" and a tag indicator having a tag name of "dark" are arranged in the key frames on the space line 609 by the tag editing unit 104, respectively. The frame specified by the display position cursor 605 of the time line 604 and specified by the display position cursor 605 of the space line 609 is displayed in the frame display area 611.

In step ST3, the space line editing unit 103 edits the space line in the animation which is the target to be edited on the basis of the space line 609 displayed on the main operation screen 601 and according to the editing command to edit the space line inputted to the animation editing management unit 101. The editing process of editing the space line will be explained in detail with reference to FIG. 9 which will be mentioned below.

Furthermore, the tag editing unit 104, in step ST3, brings the tag which is specified via the animation editing management unit 101 and which the editor desires into correspondence with the specified position on the space line 609 displayed on the main operation screen 601 on the basis of the space line 609. The tag arranging unit 105 creates and arranges the tag at the screen position of the key frame which is specified by the animation editing management unit 101.

By enabling the editor to select and operate a part in the frame currently being displayed in the frame display area 611 via the animation editing management unit 101, the time line editing unit 102, the space line editing unit 103, the tag editing unit 104, and the tag arranging unit 105 perform an editing process according to the operation information.

In addition, for the time line, a change in the position of each part and a change in the display state of each part with time between key frames can be specified from the information about the interpolation, as mentioned above. In contrast, for the space line, a change in the position of each part of the animation data and a change in the display state of each part, which are caused by the distance between a tag and the part, can be specified from the information about the interpolation in the frame screen in which the animation data are arranged as parts. Thus, because the display position of each part on the time line and that on the space line (the frame in which each part is displayed) are determined according to different factors, the animation data which are the target to be edited can have both the time line and the space line, or can alternatively have only either one of them.

However, the same parameter of the same part cannot be changed both for the time line and for the space line. For example, the animation editing device cannot cope with both a process of changing the X coordinate of a part on the screen on the time line (moving the part in an X axial direction of the screen) and a process of changing the X coordinate of the same part on the space line because the animation editing device cannot determine which one of the parameter determined for the time line (e.g., the X coordinate of the part on the screen) and the parameter determined for the space line should be used as the X coordinate.

Returning to the explanation of FIG. 3, the animation editing management unit 101 updates the screen display created on the display, the output sound to the speaker, or the like according to the animation data changed in step ST3 (step ST4; edit result output step). After that, the animation editing management unit returns to the process of step ST1 and enters the input waiting state in which it waits for an editing command again, and then repeats the processes from the process of step ST2.

(2) Animation Editing Process

Figure 5:
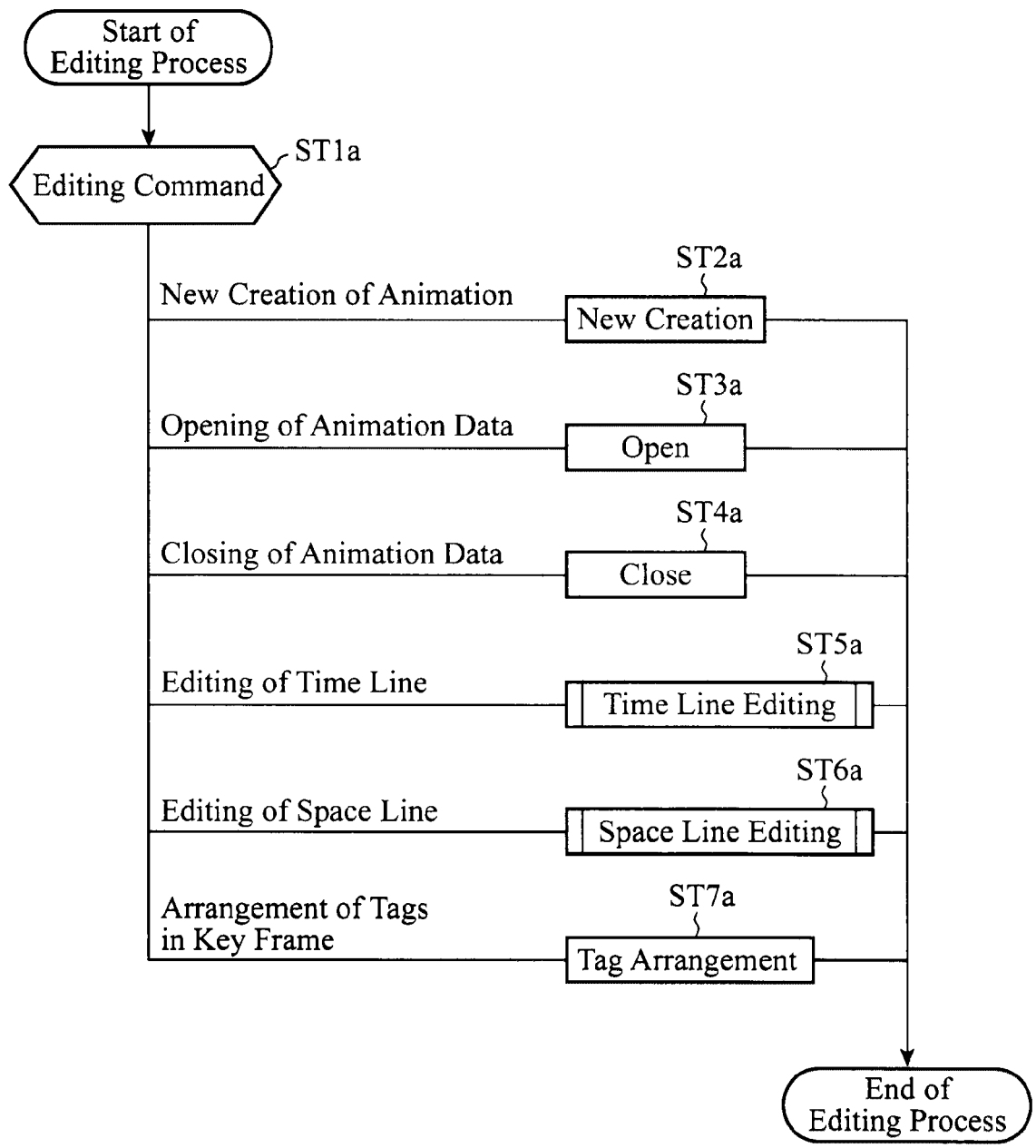
FIG. 5 is a flow chart showing a flow of a process in an editing process step shown in FIG. 3.

FIG. 5 is a flow chart showing a flow of the process in the editing process step shown in FIG. 3, and an explanation of an outline of the editing process will be made with reference to this flow chart.

In the editing process step, the animation editing management unit 101 displays the main operation screen 601 shown in FIG. 4, and enters the state in which it waits for an editing command. At this time, when receiving an editing command about one item of the main operation screen 601 which the editor selects by using the input device (not shown), the animation editing management unit 101 determines the editing process corresponding to the item specified by the editing command (step ST1a).

As a method of storing animation data in the storage medium 106 in accordance with the present invention, a method of storing animation data in the storage medium 106 without having to explicitly issue a storage command every time when an editing process is carried out is adopted instead of a typical method of opening, editing, or storing a file which is used in a personal computer (referred to as a PC from here on). This is because each of the editing units of the animation editing device in accordance with present invention directly edits not only animation data loaded into a memory but also data stored in the storage medium 106. The use of this method makes data which each of the editing units handles have the same structure as data stored in the storage medium 106.

When "new creation" (not shown in FIG. 4) in the menu bar 602 of the main operation screen 601 is selected in step ST1a, the animation editing management unit 101 starts a process of newly creating an animation (step ST2a). At this time, the animation editing management unit 101 discards animation data currently being edited and creates an empty time line and key frames, as a preparation for newly creating an animation, while securing an area for storing animation data on the storage medium 106.

In contrast, when "open" (not shown in FIG. 4) in the menu bar 602 of the main operation screen 601 is selected, the animation editing management unit 101 sets the existing animation data specified through the "open" operation as the target to be edited by each of the editing units (step ST3a). At this time, as a preparation for editing the existing animation data, the animation editing management unit reads the animation data 107 specified through the "open" operation from the storage medium 106 after discarding the animation data currently being edited, and then converts the animation data into data having a data format which can be edited.

When "close" (not shown in FIG. 4) in the menu bar 602 of the main operation screen 601 is selected, the animation editing management unit 101 ends the editing process of editing the animation data specified through the "close" operation (step ST4a).

When the time line 604 of the main operation screen 601 is operated, the animation editing management unit 101 outputs the operation information to the time line editing unit 102. The time line editing unit 102 reads the time line data 108 of the animation data 107 which are specified by the editing command from the storage medium 106, and performs the operation based on the inputted operation information on the time line data 108 (step ST5a).

When the space line 609 of the main operation screen 601 is operated, the animation editing management unit 101 outputs the operation information to the space line editing unit 103. The space line editing unit 103 reads the space line data 109 of the animation data 107 which are specified by the editing command from the storage medium 106, and performs the operation based on the inputted operation information on the space line data 109 (step ST6a). When the editing command is a command to define a tag on the space line 609, the space line editing unit 103 starts the tag editing unit 104 to set the tag having the specified name at the specified position on the space line 609.

Furthermore, when a position in a key frame of the time line 604 or the space line 609 displayed on the main operation screen 601 is specified by using the input device (not shown), and an editing operation of arranging the tag whose name is specified by using the above-mentioned input device at the above-mentioned specified position is then performed, the animation editing management unit 101 outputs the operation information to the tag arranging unit 105.

The tag arranging unit 105 creates and arranges the tag whose name is specified at the specified position of the key frame screen (step ST7a). After each of the editing processes mentioned above is completed, the animation editing management unit 101 ends the editing process step, and then makes a transition to the edit result output step shown in FIG. 3.

(2-1) Time Line Editing Process

Figure 6:
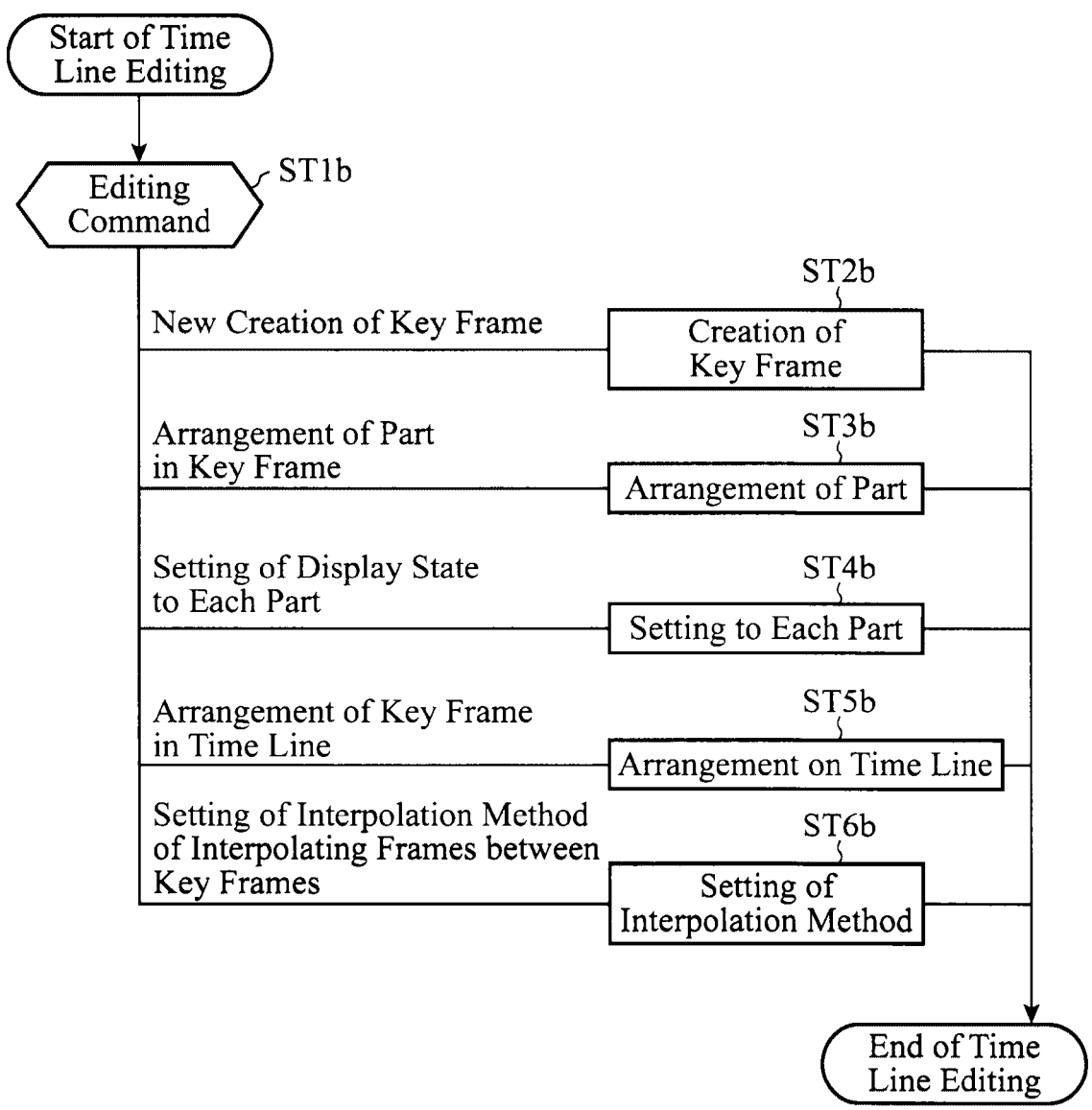
FIG. 6 is a flow chart showing a flow of a time line editing process carried out by the animation editing device in accordance with Embodiment 1.

FIG. 6 is a flow chart showing a flow of the time line editing process carried out by the animation editing device in accordance with Embodiment 1, and shows the details of the process in step ST5a of FIG. 5. The details of the process will be explained with reference to the flow chart. The time line editing unit 102 determines the editing process according to the edit information inputted from the animation editing management unit 101 (step ST1b), and then branches to a corresponding editing process.

When the edit information inputted from the animation editing management unit 101 is new creation of a key frame, the time line editing unit 102 newly creates a key frame and initializes this key frame in an available state (an empty frame in which no part is arranged) (step ST2b).

When the edit information is arrangement of a part in a key frame, the time line editing unit 102 creates and arranges the specified part in the specified display state at the specified position of the key frame according to the description of the editing command (step ST3b). In this case, as the part, not only a line segment, a geometric figure, an image, a character, or the like, but also a part for user interface, such as a button, a label or a check box, can be specified. Created animation data can be alternatively specified.

When the edit information is a setting of a display state to a part, the time line editing unit 102 sets various attributes corresponding to the part display state to the specified part according to the description of the editing command (step ST4b). As the attributes, a position and a size in a key frame, rotation, a color, a font, an image file name, a transformation matrix for deformation, etc. can be set. The attributes which can be set differ according to the type of the part (the type of an object which can be specified as the above-mentioned part).

Furthermore, when an editing command to arrange a key frame on the time line is issued, the time line editing unit 102 arranges the key frame at the specified position on the time line according to the description of the editing command (step ST5b).

When the editing command is a command to set a method of interpolating frames between key frames, the time line editing unit 102 sets the method of interpolating frames between key frames to the attributes of each part whose position or display state changes between key frames according to the description of the editing command (step ST6b). As the method of interpolating frames between key frames, a linear interpolation or a spline interpolation is specified, for example. After each of the above-mentioned editing processes is completed, the time line editing unit 102 ends the time line editing process.

Figure 7:
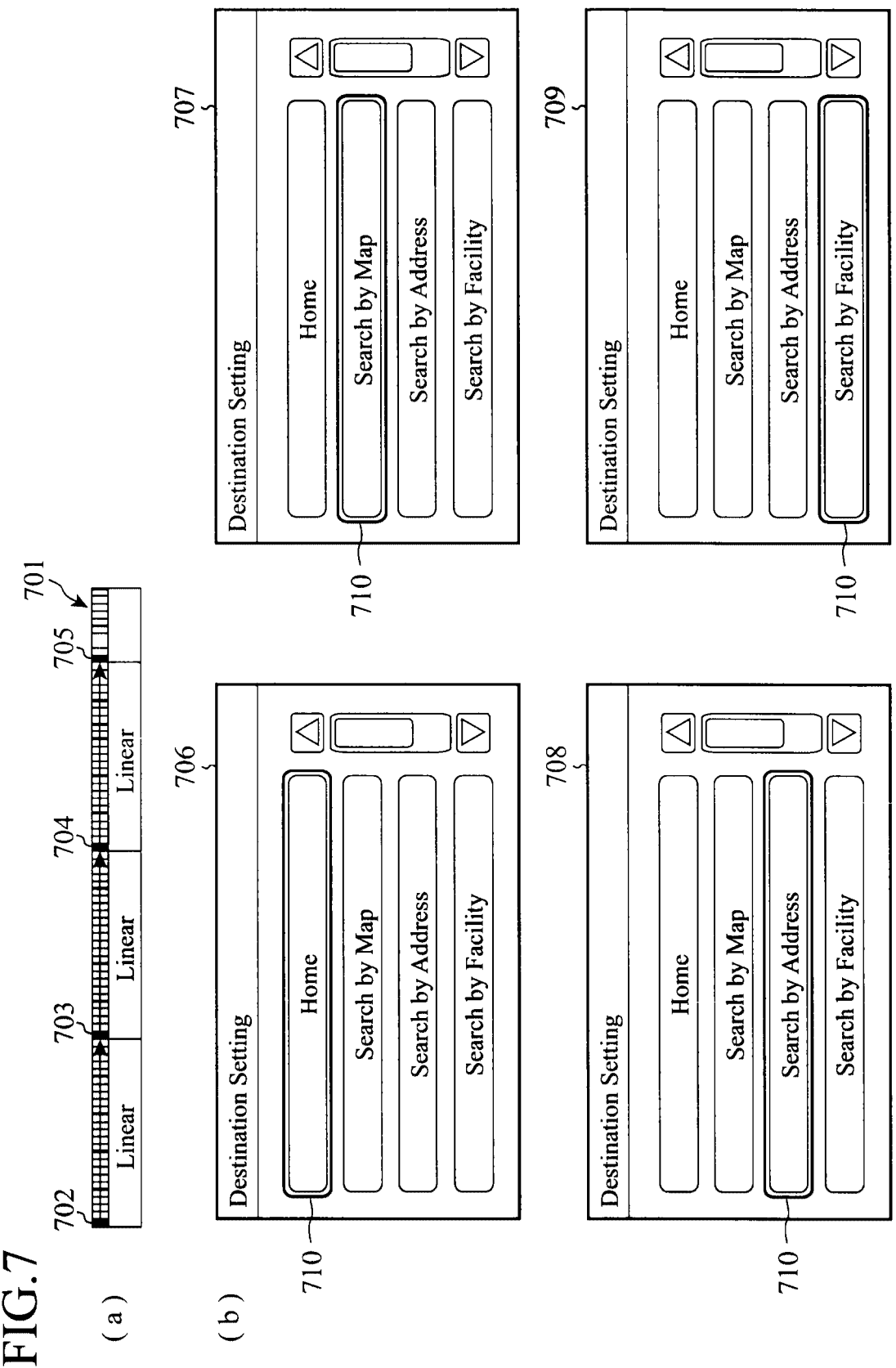
FIG. 7 is a view showing a concrete example of the time line editing process.

FIG. 7 is a view showing a concrete example of the time line editing process, and FIG. 7(a) shows the time line and FIG. 7(b) shows each key frame on the time line shown in FIG. 7(a). Four key frames 702 to 705 are arranged on the time line 701 shown in FIG. 7(a), and frames are set and arranged between any two adjacent key frames with a linear interpolation.

In the example shown in FIG. 7, because a cursor part in each of the screens of the key frames 702 to 705 is arranged in such a way as to move from an upper button to a lower button one by one in the time order on the time line, an animation in which the cursor part moves from a top button to a bottom button is acquired as the results of the linear interpolation between any two adjacent ones of the key frames. In FIG. 7(b), creation of a display of the key frame 702 results in a display screen 706, and the cursor part 710 is displayed at the button position of "home" on the screen. Furthermore, the key frame 703 corresponds to a display screen 707, the key frame 704 corresponds to a display screen 708, and the key frame 705 corresponds to a display screen 709. By thus setting the time line 701, the animation in which the cursor part 710 moves to a lower button one by one with time can be defined.

Figure 8:
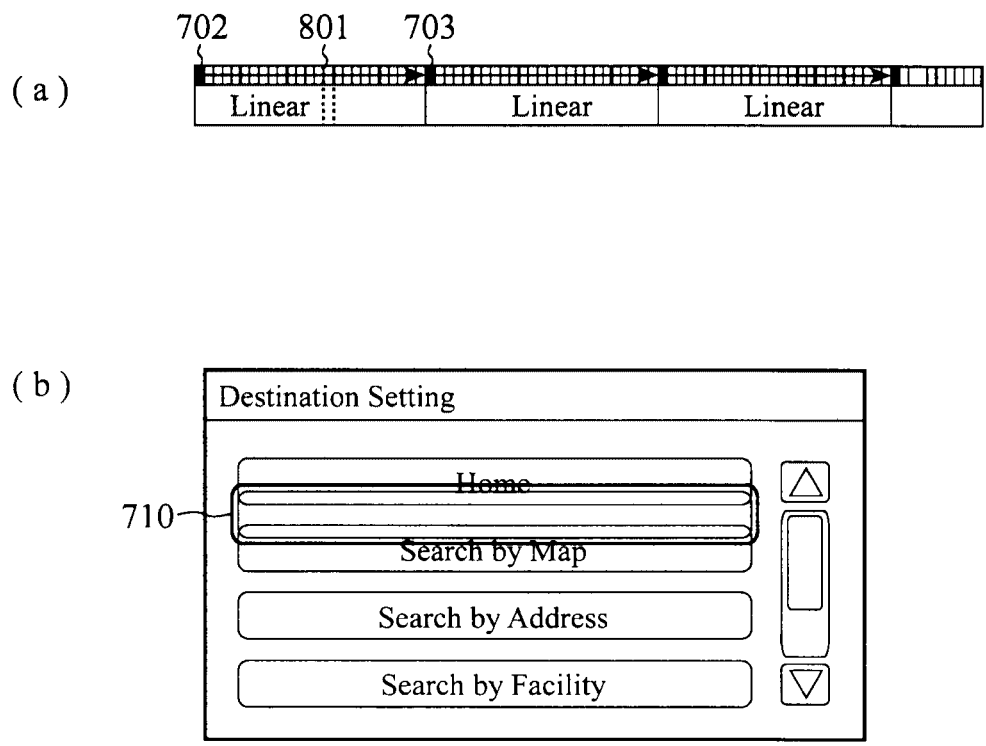
FIG. 8 is a view showing another example of the time line editing process.

FIG. 8 is a view showing another example of the time line editing process, and FIG. 8(a) shows the time line and FIG. 8(b) shows a frame between key frames on the time line shown in FIG. 8(a). In the example of FIG. 8, the display position cursor of the time line 701 is moved to a midway point 801 between the key frame 702 and the key frame 703 in the example of the editing process shown in FIG. 7.

When an operation of moving the display position cursor to the frame at the midway point 801 between the key frames 702 and 703 is performed as the editing operation, the cursor part 710 arranged in each of the key frames can be displayed on the screen (in the frame at the midway point 801) in a state in which the cursor part 710 is moved to a position midway between the position of the "home" button and the position of a "search by map" button, as shown in FIG. 8(b).

As mentioned above, the animation editing device in accordance with the present invention can easily display the display state (position etc.) in each frame of a predetermined part (the cursor part 710) arranged in each of the key frames by simply moving the display position cursor to a desired position on the time line.

(2-2) Space Line Editing Process

Figure 9:
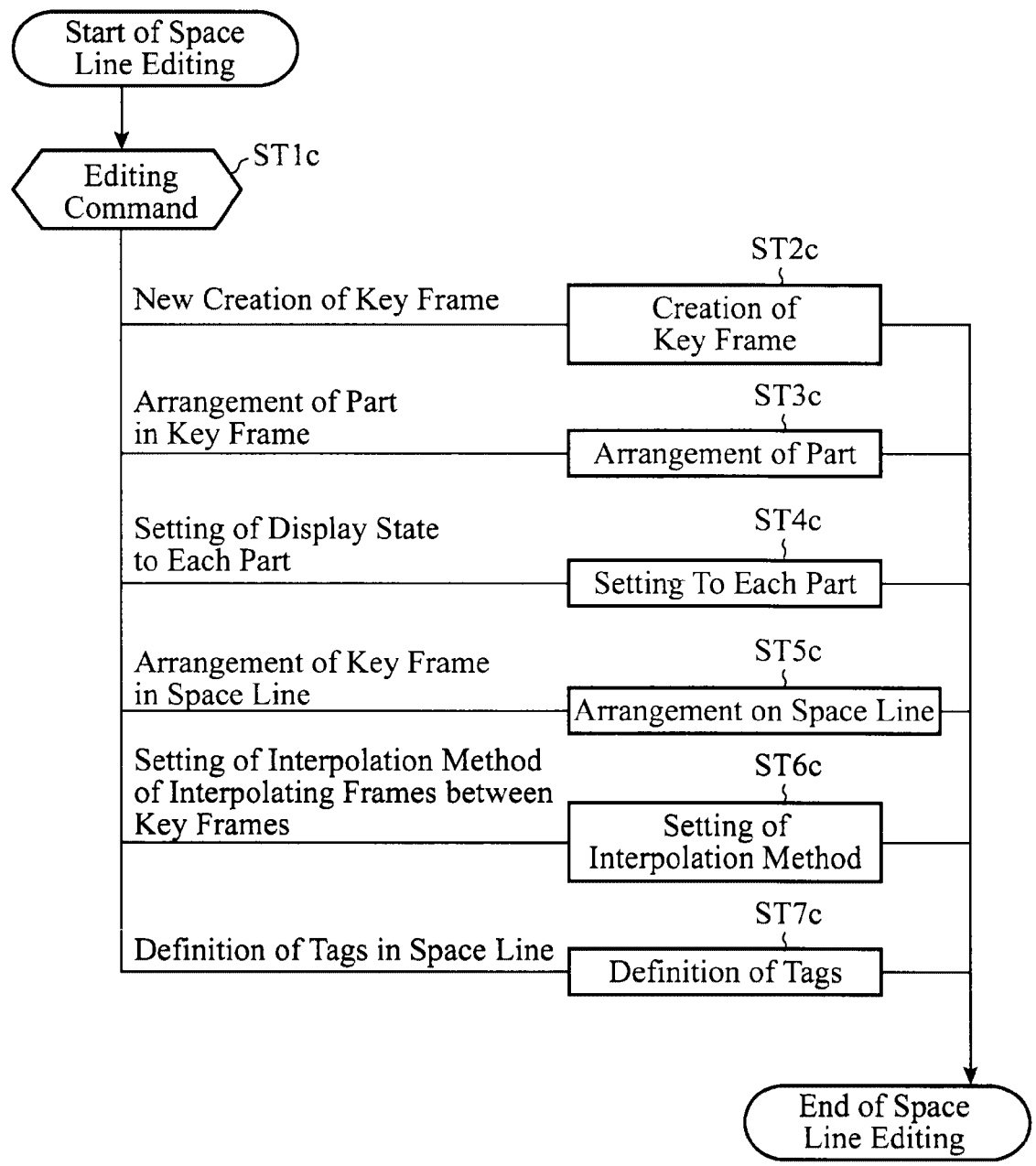
FIG. 9 is a flow chart showing a flow of a space line editing process carried out by the animation editing device in accordance with Embodiment 1.

FIG. 9 is a flow chart showing a flow of the space line editing process carried out by the animation editing device in accordance with Embodiment 1, and shows the details of the process in step ST6a of FIG. 5. The space line editing unit 103 determines the editing process according to the edit information inputted thereto from the animation editing management unit 101 (step ST1c), and branches to the corresponding editing process. Because processes of editing a key frame of steps ST2c, ST3c, ST4c, and ST6c are the same as those of the above-mentioned time line editing process, the explanation of the processes will be omitted hereafter.

When the editing command is a command to arrange a key frame in the space line, the space line editing unit 103 arranges the key frame at the specified position on the space line according to the edit information (step ST5c).

In contrast, when the editing command is a command to define a tag on the space line, the space line editing unit 103 starts the tag editing unit 104. As a result, the tag editing unit 104 creates and arranges the tag at the specified position on the space line according to the edit information (step ST7c). A name is given to the tag as an identifier. After completing each of the editing processes, the space line editing unit 103 or the tag editing unit 104 ends the space line editing process.

FIG. 10 is a view showing a concrete example of the space line editing process, and FIG. 10(a) shows the space line. Two key frames 902 and 903 are arranged on the space line 901 shown in FIG. 10(a), and frames are set and arranged between any two adjacent key frames with a linear interpolation.

Furthermore, a tag 904 having a tag name of "light" is arranged in the key frame 902, and a tag 905 having a tag name of "dark" is arranged in the key frame 903. Although the case in which the tags are set to the key frames, respectively, is shown in the example shown in FIG. 10(a), a tag can be alternatively arranged at a position other than the key frames (e.g., a midway point 908).

Three cursors shown in FIG. 10(b) are arranged in frames having the same sizes as the cursors, respectively. In the example of FIG. 10, an editing process of not changing the position of the focus in each frame, but changing only the color of the focus is carried out. Thus, the focal color of the cursor part in each frame between the key frames 902 and 903 is linearly interpolated in such a way as to make a transition to a fixed color. In FIG. 10(b), the cursor part 906 is a display of the key frame 902, and is displayed with its focus being colored in white because the cursor part 906 has a focal color attribute which is set to white. Furthermore, the cursor part 907 is a display of the key frame 903, and is displayed with its focus being colored in gray because the cursor part 907 has a focal color attribute which is set to gray.

When an operation of moving the display position cursor to the frame at the midway point 908 between the key frames 902 and 903 on the space line 901 is performed as the editing operation, a screen in which the cursor part 909 is displayed can be displayed as shown in FIG. 9(b). In this case, because a linear interpolation between the display color of the cursor part 906 and that of the cursor part 907 is carried out, the cursor part 909 is displayed in bright gray which is color intermediate between the display color of the cursor part 906 and that of the cursor part 907.

As mentioned above, the animation editing device in accordance with the present invention can easily display the display state in each frame of a predetermined part (the cursor part 909) arranged in each of the key frames by simply moving the display position cursor to a desired position on the space line.

(2-3) Tag Arranging Process

Figure 11:
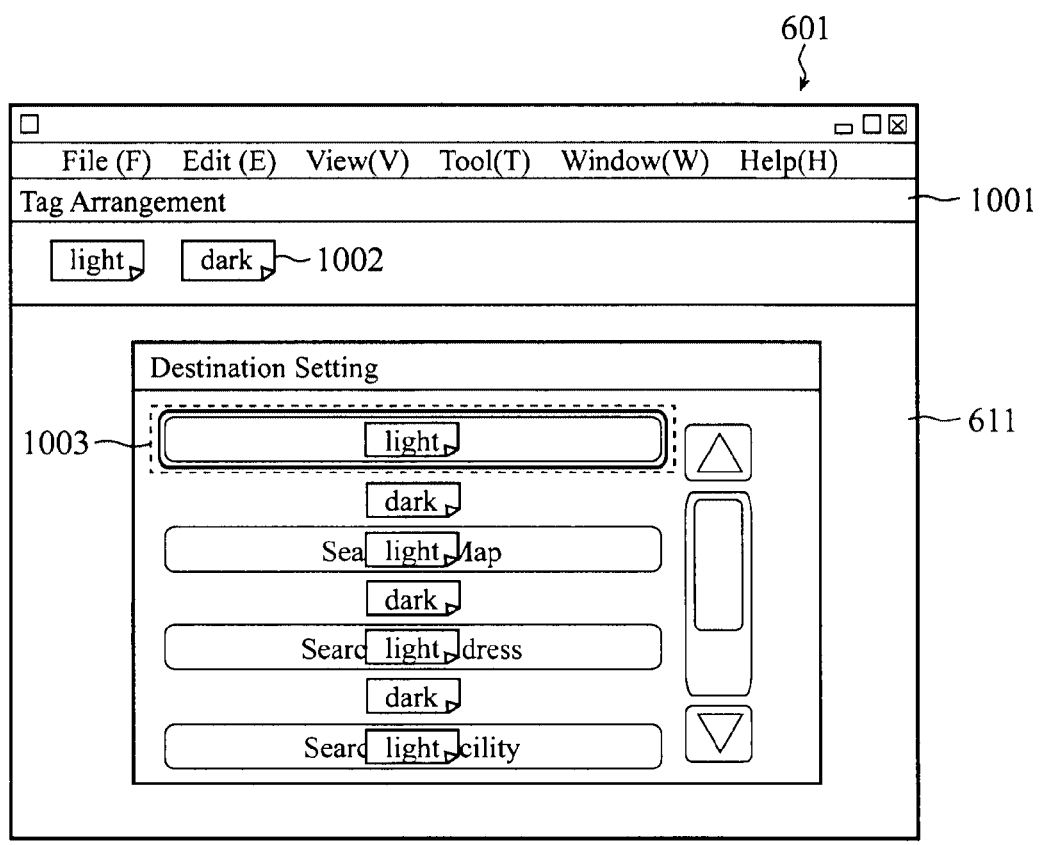
FIG. 11 is a view showing a concrete example of a tag arranging process carried out by the animation editing device in accordance with Embodiment 1.

FIG. 11 is a view showing a concrete example of the tag arranging process carried out by the animation editing device in accordance with Embodiment 1, and shows a screen which is displayed when an editing operation of arranging a tag is performed on the main operation screen shown in FIG. 4.

When the editor selects a part (in the example of FIG. 11, the cursor part) in which its display state is defined in the space line in the main operation screen 601, and then performs an operation of issuing an editing command to arrange a tag, the tag arranging unit 105 is started by the animation editing management unit 101, and the main operation screen makes a transition to the screen shown in FIG. 11. The selected part (the cursor part) is highlighted by a display 1003 of a selected choice.

In FIG. 11, tags 1002 of the selected part which are defined in the space line are listed in a tag display area 1001. When the editor selects a tag 1002 which he or she desires to arrange on the display screen from the tags 1002 listed in the tag display area 1001 by using the not-shown input device in the animation editing management unit 101 and then specifies a desired position in the frame of the frame display area 611, the animation editing management unit arranges the selected tag at the position. An arbitrary number of tags can be arranged in the frame.

Although in the example of FIG. 11 the case in which a part arranged on the screen is specified and an editing command to arrange a tag is executed is shown, an animation part already defined (created) can be alternatively specified with a filename or the like and an editing command to arrange a tag can be executed. Furthermore, although it is assumed in FIG. 11 that tags are arranged in a key frame, like another part, tags can be arranged within a range of arbitrary frames regardless of the presence or absence of key frames.

Figure 12:
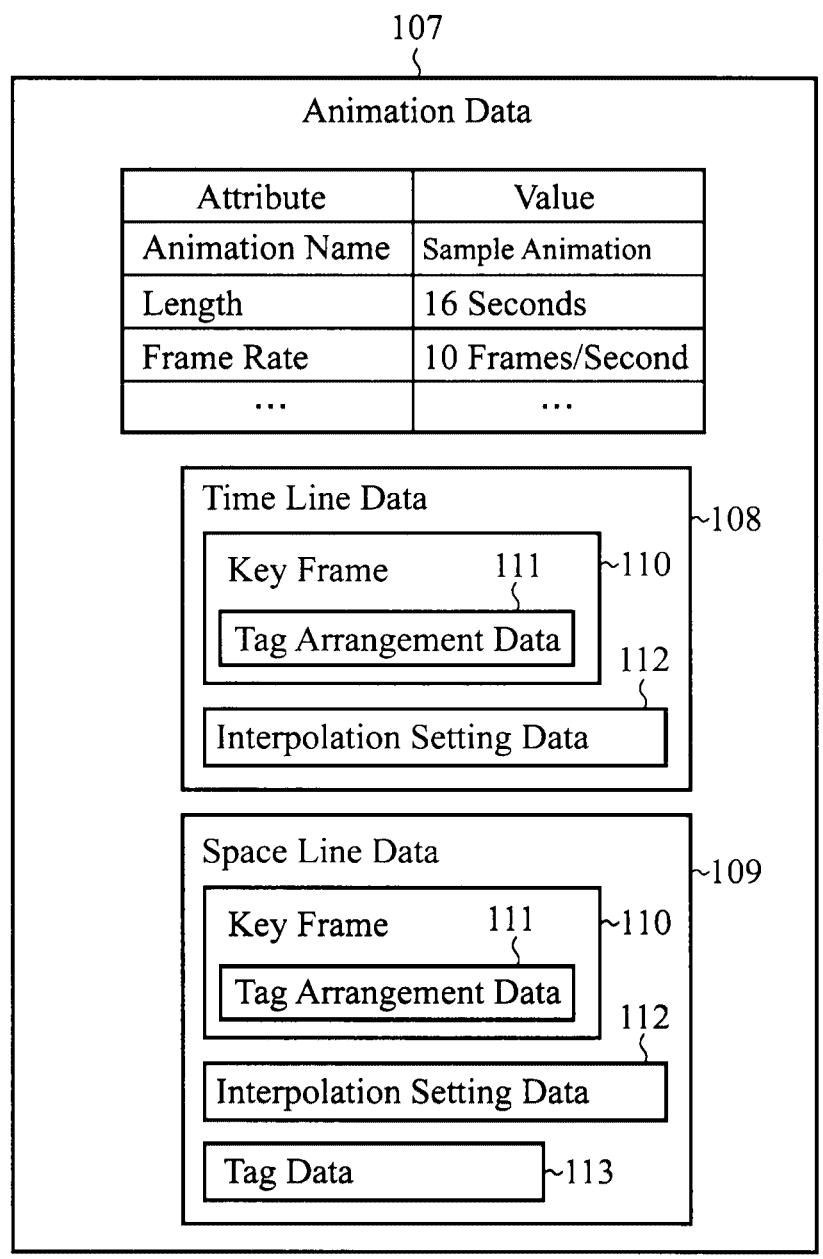
FIG. 12 is a view showing an example of the data structure of animation data.

FIG. 12 is a view showing an example of the data structure of the animation data. As shown in FIG. 12, the animation data 107 have a plurality of attributes showing a general description of the data. An animation name is given to the animation data. A length is data expressing the full length of the animation in seconds. A frame rate shows the number of frames which are displayed per second.

Figure 13:
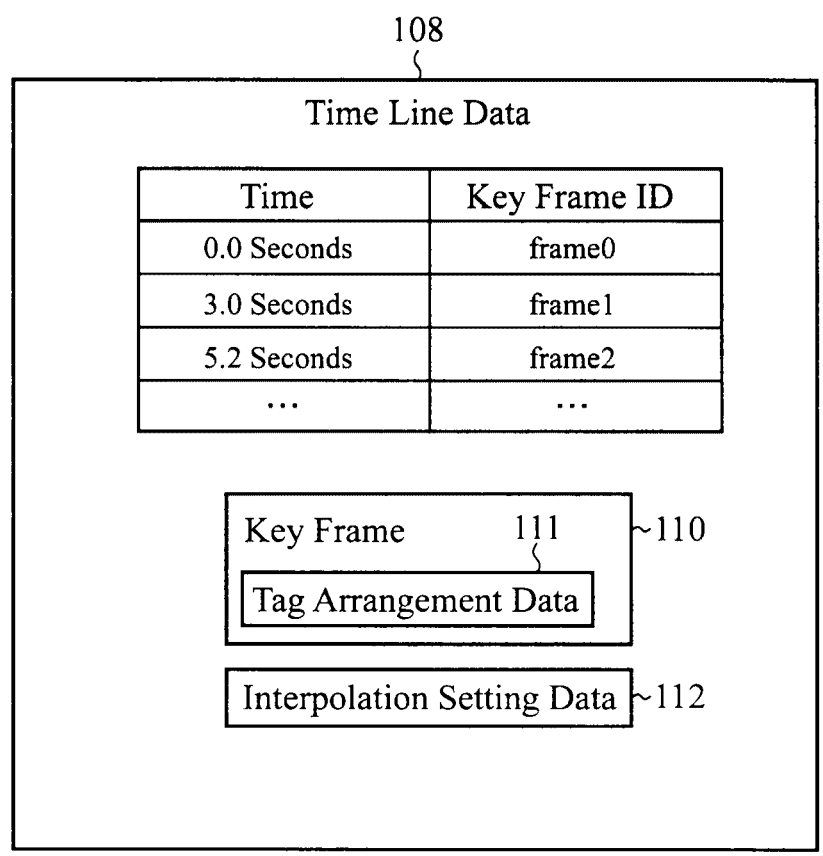
FIG. 13 is a view showing an example of the data structure of time line data.

FIG. 13 is a view showing an example of the data structure of the time line data. In FIG. 13, the time line data 108 has the times at which the key frames are respectively set in the time line. For example, a key frame having a key frame ID of frame0 is assigned after a lapse of 0.0 seconds (head) since the start of the animation (each key frame is identified by its key frame ID). Furthermore, a key frame having a key frame ID of frame1 is assigned after a lapse of 3.0 seconds since the start of the animation, and a key frame having a key frame ID of frame2 is assigned after a lapse of 5.2 seconds since the start of the animation.

FIG. 14 is a view showing an example of the data structure of the key frame data. As shown in FIG. 14(a), data about the plurality of key frames are stored in the key frame data 110. A key frame ID is assigned to data about each key frame. Furthermore, the data about each key frame consists of a list of parts or tags arranged in the key frame (defined by the tag arrangement data 111).

FIG. 14(b) shows the data about each key frame. As shown in FIG. 14(b), a part name is given to each part, and serves as a part identifier in the key frame. Furthermore, a part type is specified for each part. The part type includes an image, a text, animation data, a tag, and so on. In addition, each part has data according to its type. As common data, there are coordinates X and Y of each part in each frame. Furthermore, a part having a size has a width W and a height H as data. Binary data are also set to an image and animation data. A tag has a tag name as data.

Figures 15, 16:
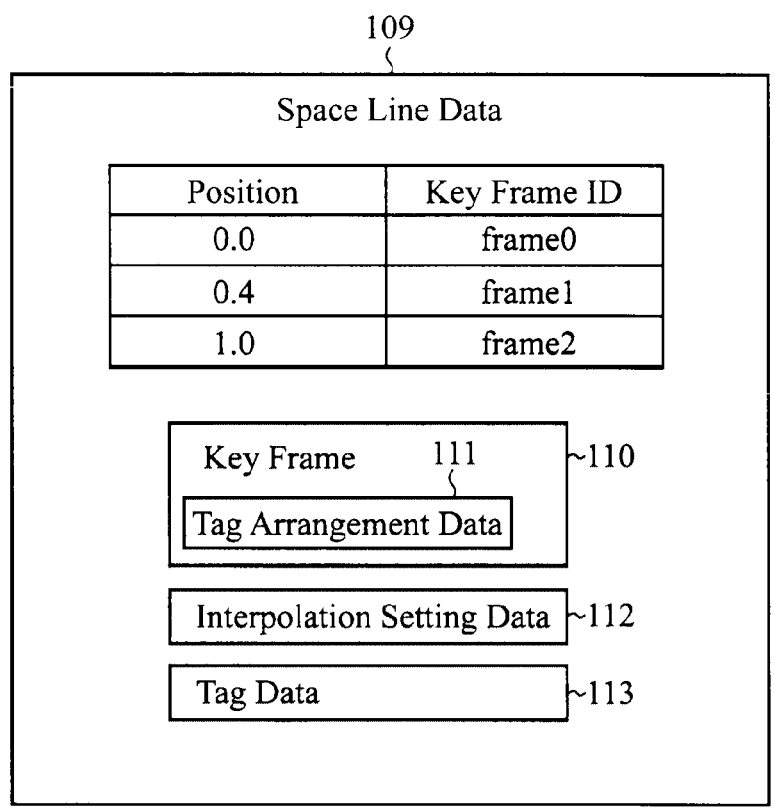
FIG. 15 is a view showing an example of the data structure of interpolation setting data.
FIG. 16 is a view showing an example of the data structure of space line data.

FIG. 15 is a view showing an example of the data structure of the interpolation setting data. In FIG. 15, an interpolation method of interpolating frames following each key frame is set to the interpolation setting data 112. A key frame which is an object to which the interpolation method is set is specified for each key frame ID. A part in the key frame which is an object to which the interpolation method is set is specified for each part name. A property to be interpolated in the part is specified for each property. As the property, a property specific to the part, like the coordinate X or Y, or the width W or the height H as the part's size, can be specified. As the interpolation method, an interpolation method of interpolating values of the property can be specified.

FIG. 16 is a view showing an example of the data structure of the space line data. As shown in FIG. 16, the space line data 109 have, as data, the position where each key frame is set on the space line. This position is normalized by setting the head position to 0.0 and setting the end position to 1.0. In the example shown in FIG. 16, the key frame having a key frame ID of frame0 is assigned to 0.0 which is the head position, the key frame having a key frame ID of frame1 is assigned to a position of 0.4, and the key frame having a key frame ID of frame2 is assigned to 1.0 which is the end position.

Figure 17:
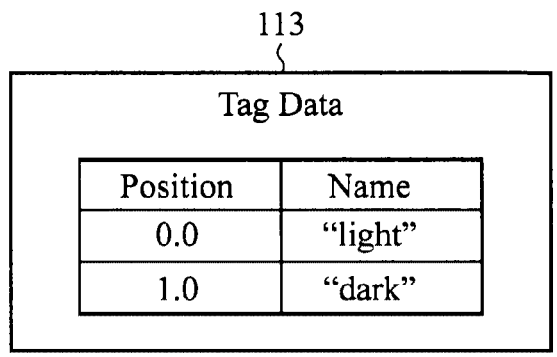
FIG. 17 is a view showing an example of the data structure of tag data.

FIG. 17 is a view showing an example of the data structure of the tag data. As shown in FIG. 17, the tag data 113 has a position and a name of each tag as data. This position is defined by a tag in the space line. The name is used as an identifier attached to the tag.

As mentioned above, the animation editing device in accordance with this Embodiment 1 includes the data storage unit 106 for storing the animation data 107 including the time line data 108 in which a layout of key frames, arrangement of tags in each of the key frames and information about interpolation of frames between the key frames are defined on the basis of the time line, and the space line data 109 in which a layout of the key frames, arrangement of tags in each of the key frames and information about interpolation of frames between the key frames are defined on the basis of the space line, the space line data having the tag data 113 for defining the tags arranged on the space line, and displays the time line and the space line which are defined by the time line data 108 and the space line data 109 included in the animation data 107 to be edited read from the data storage unit 106, and the contents of the frames based on the time line and the space line, accepts an editing command, and carries out one of time line editing, space line editing, tag editing, and tag arrangement according to an editing command which is inputted as a response to the displayed information. Because by doing in this way, the animation editing device in accordance with this Embodiment 1 can edit the animation while easily bringing any animation image position on the display screen into correspondence with the display state at the position, the animation editing device can provide an improvement in the animation editing efficiency. Furthermore, the animation editing device in accordance with this Embodiment 1 provides a remarkable advantage of enabling the editor to easily grasp the correspondence between the positions of animation parts and their display states from the arrangement of tags in the frames (see the screen of FIG. 11) and also from the animation edit result, the advantage being not provided by any conventional animation editing device.

Embodiment 2

Figure 18:
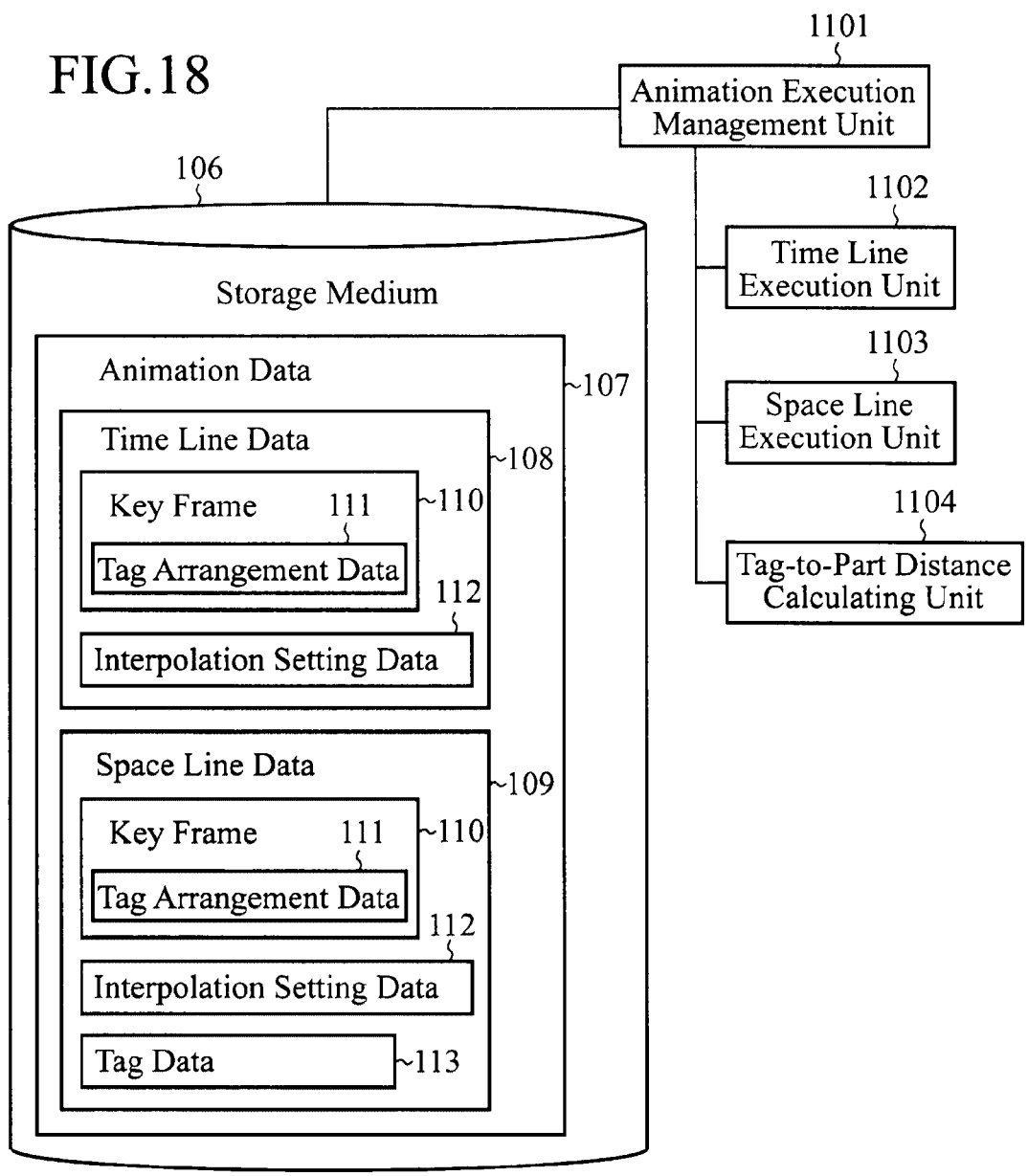
FIG. 18 is a block diagram showing the structure of an animation playback device in accordance with Embodiment 2 of the present invention.

FIG. 18 is a block diagram showing the structure of an animation playback device in accordance with Embodiment 2 of the present invention. As shown in FIG. 18, the animation playback device in accordance with Embodiment 2 is provided with an animation execution management unit 1101, a time line executing unit 1102, a space line executing unit 1103, and a tag-to-part distance calculating unit (distance calculating unit) 1104, in addition with a storage medium 106 of FIG. 1 shown in above-mentioned Embodiment 1 and the structure of animation data 107 stored in the storage medium.

While the animation execution management unit 1101 reads the animation data 107 from the storage medium 106, the animation execution management unit 1101 executes the animation data to display an animation which the animation execution management unit has acquired as the result of the execution on a screen, and present the animation for a user. The animation execution management unit uses output a device (not shown), such as a display or a speaker, to output the result of the execution.

The time line executing unit 1102 creates a key frame, creates a part in the key frame, and carries out interpolation of frames between key frames on the basis of information about a time line to create an animation image which is successively displayed at run time. The space line executing unit 1103 creates a key frame, creates apart in the key frame, and carries out interpolation of frames between key frames on the basis of information about a space line to create an animation image which is successively displayed at run time.

The tag-to-part distance calculating unit 1104 calculates distance information about the distance between each tag and a part which are arranged in each key frame according to a positional relationship between each tag and the part to determine the display position of the part on the space line (the frame in which the part is displayed) from the distance information. The space line executing unit 1103 creates an animation image in which parts are arranged on the screen according to their display positions on the space line which are determined by the tag-to-part distance calculating unit 1104.

The animation playback device in accordance with Embodiment 2 is constructed on a computer as shown in FIG. 2 in above-mentioned Embodiment 1. More specifically, the animation execution management unit 1101, the time line executing unit 1102, the space line executing unit 1103, and the tag-to-part distance calculating unit 1104 can be implemented on the computer as concrete units in each of which hardware and software work in cooperation with each other by causing the above-mentioned computer to read a program for animation playback according to the scope of the present invention and then causing a CPU 202 to execute the program.

Furthermore, an output device controller 205 carries out a display of a command selection screen or a content to be played back or an audio output via a display 206 or a speaker 208, and the user is allowed to use an input unit shown in FIG. 2, such as a remote controller not shown, to cause the animation playback device to execute a command for the animation execution management unit 1101, the time line executing unit 1102, the space line executing unit 1103, and the tag-to-part distance calculating unit 1104 via an input device controller 201. In addition, the storage medium 106 can be constructed on a storage area of a hard disk 203 or a memory 204, which is normally built in the above-mentioned computer, or on a memory medium in an external storage device.

Next, the operation of the animation playback device will be explained.

Hereafter, a process of determining the display position of each part on the space line from a positional relationship between each tag arranged on the screen and each part which defines a tag will be explained in detail.

FIG. 19 is a view showing an example of a reference point at the time of defining a position on the screen, FIG. 19(*a*) shows a reference point of a cursor part, and FIG. 19(*b*) shows a reference point of a tag. As shown in FIG. 19(*a*), the cursor part 1201 has a reference point at a central point 1202 thereof (at the center of a cross). It is assumed that the position of this reference point on the screen is the position of the cursor part. As shown in FIG. 19(*b*), the tag 1203 has a reference point at a central point 1204 thereof, too. Although the central point of each of parts and tags is defined as its reference point, as mentioned above, the initial position of the reference point of each of parts and tags can be set to its center or centroid position, and the editor is enabled to move the reference point to an arbitrary position as needed.

FIG. 20 is a view showing a general description of the process of determining the display position of each part on the space line from a positional relationship between each part and each tag. FIG. 20(*a*) shows a positional relationship between a cursor part and each tag, and FIG. 20(*b*) shows how to determine the display position of the cursor part on the space line (i.e., the frame in which the cursor part is displayed) from the positional relationship of FIG. 20(a). The cursor part 1301 and the tags 1302 and 1304 which are shown in FIG. 20(a) have reference points at the same positions as those of the cursor part and the tag shown in FIGS. 19(a) and 19(b), respectively.

The tag-to-part distance calculating unit 1104 calculates both the distance 1303 between the reference point of the cursor part 1301 and the reference point of the tag 1302 (referred to as a distance L from here on), and the distance 1305 between the reference point of the cursor part 1301 and the reference point of the tag 1304 (referred to as a distance D from here on) from the coordinate on the screen of the cursor part 1301, that of the tag 1302 having a tag name of "light", and that of the tag 1304 having a tag name of "dark".

Next, by assuming a point P1309 located between a tag 1307 and a tag 1308 on the space line 1306 on which the tags 1302 and 1304 are defined, the tag-to-part distance calculating unit 1104 calculates the position of the point P1309 in such a way that the ratio of the distance 1310 between the tag 1307 and the point P1309 and the distance 1311 between the tag 1308 and the point P1309 is equal to the ratio of the distance L and the distance D which are calculated as mentioned above. The tag-to-part distance calculating unit then defines the position of the point P1309 which it has determined through the above-mentioned calculation as the display position of the cursor part on the space line. The animation playback device uses the display state (frame) at the position of this point P1309 for display of the cursor part 1301.

In this embodiment, although the case in which the reference points of the tags 1302 and 1304 are arranged on a straight line with respect to the reference point of the cursor part 1301 is mentioned as an example for the sake of simplicity, the distance between the cursor part 1301 and each of the tags 1302 and 1304 can be calculated from the positional relationship between the cursor part 1301 and each of the tags 1302 and 1304 even in a structure in which the tags are not aligned on the above-mentioned straight line, and the display position of the cursor part on the space line can be determined according to this distance.

Furthermore, the direction of movement of the cursor part 1301 is not necessarily parallel to the straight line passing through the tag 1302 and the tag 1304, the display position of the cursor part on the space line can be determined according to the ratio of the distance between the cursor part and one of the tags and the distance between the cursor part and the other tag.

In addition, when two or more tags having the same name exist, by using the tag which is the nearest to the reference point of the cursor part, the tag-to-part distance calculating unit calculates the display position of the cursor part on the space line from the distance between the above-mentioned tag and the cursor part, for example.

As mentioned above, the animation playback device in accordance with this Embodiment 2 includes: the data storage unit 106 for storing the animation data 107 including the time line data 108 in which a layout of key frames, arrangement of tags in each of the key frames and information about interpolation of frames between the key frames are defined on the basis of the time line, and the space line data 109 in which a layout of the key frames, arrangement of tags in each of the key frames and information about interpolation of frames between the key frames are defined on the basis of the space line, the space line data having the tag data 113 for defining the tags arranged on the space line; the time line executing unit 1102 for creating an animation image based on a frame relationship defined by the time line data 108 from the animation data 107; the tag-to-part distance calculating unit 1104 for calculating the distance between a tag arranged in a frame and an animation part to determine the display position on the space line of the animation part, the display position corresponding to a positional relationship in the frame based on the distance; the space line executing unit 1103 for creating an animation image of the animation part from the animation data 107 on the basis of a frame relationship defined by the space line data 109, the animation image corresponding to the display position on the space line which is determined by the tag-to-part distance calculating unit 1104; and the animation execution management unit 1101 for inputting the animation data 107 to be played back read from the data storage unit 106 to the time line executing unit 1102, the tag-to-part distance calculating unit 1104, and the space line executing unit 1103 to cause them to create an animation image of the animation data 107 to be played back. Because the animation playback device in accordance with this Embodiment 2 is constructed in this way, the animation playback device can execute and display the animation in which the position of each part on the display screen is brought into correspondence with its display state.

Embodiment 3

Figure 21:
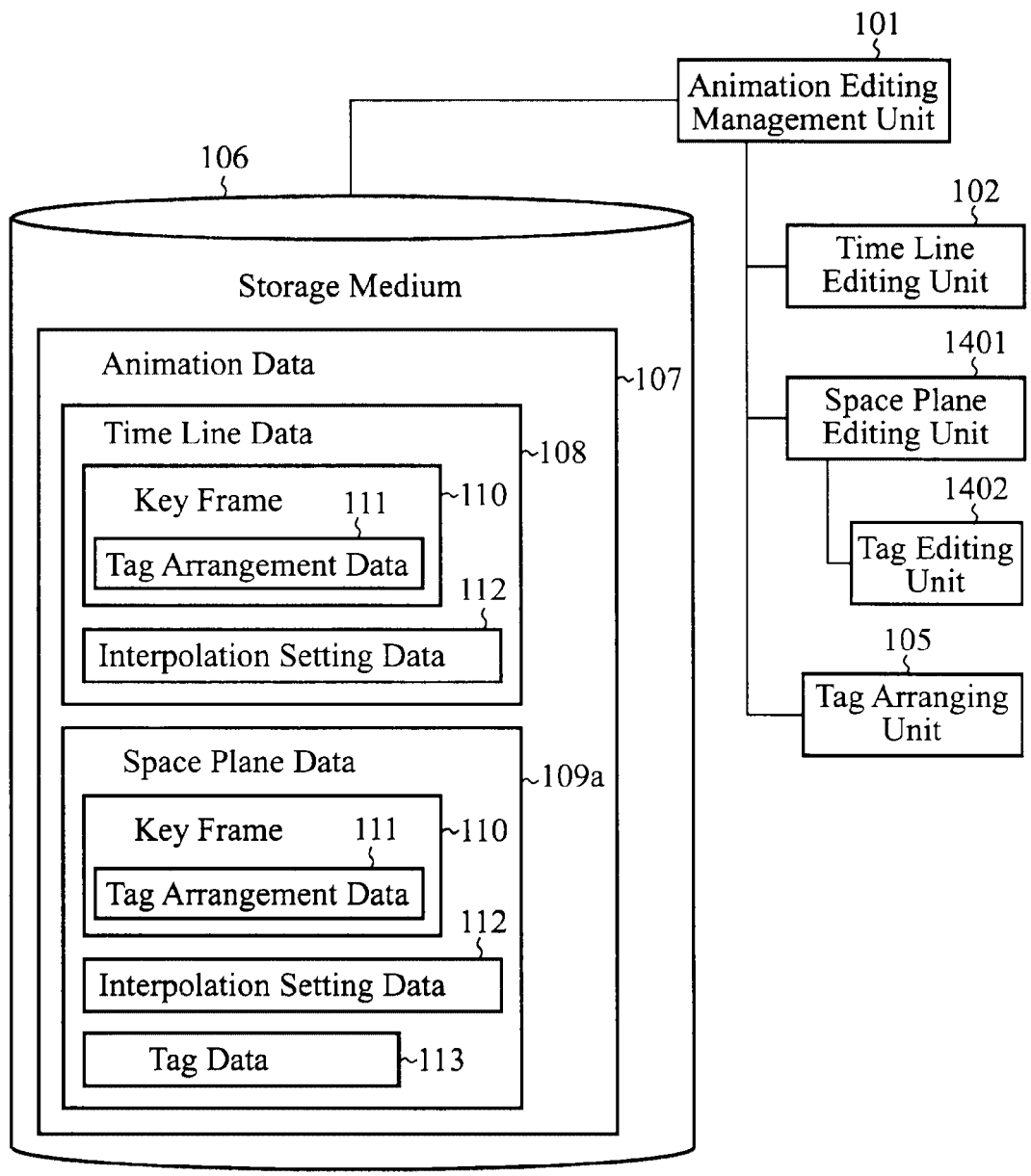
FIG. 21 is a block diagram showing the structure of an animation editing device in accordance with Embodiment 3 of the present invention.

FIG. 21 is a block diagram showing the structure of an animation editing device in accordance with Embodiment 3 of the present invention. As shown in FIG. 21, the animation editing device in accordance with Embodiment 3 is provided with a space plane editing unit 1401 and a tag editing unit 1402 instead of the space line editing unit 103 and the tag editing unit 104 in the structure of FIG. 1 shown in above-mentioned Embodiment 1.

The space plane editing unit 1401 creates a key frame, arranges a part in the key frame, arranges the key frame on a space plane, and sets information about interpolation of part positions and part display states between key frames according to an editing command inputted thereto via an animation editing management unit 101. The tag editing unit 1402 defines a tag at a specified position on the space plane. The space plane is acquired by mapping a relative positional relationship between a reference position shown by a tag and the display position of each animation part arranged in a key frame of other animation data onto a two-dimensional plane, and is stored, as space plane data 109a, in a storage medium 106.

The animation editing device in accordance with Embodiment 3 is constructed on a computer as shown in FIG. 2 in above-mentioned Embodiment 1. More specifically, the animation editing management unit 101, a time line editing unit 102, the space plane editing unit 1401, the tag editing unit 1402, and a tag arranging unit 105 can be implemented on the computer as concrete units in each of which hardware and software work in cooperation with each other by causing the above-mentioned computer to read a program for animation editing according to the scope of the present invention and then causing a CPU 202 to execute the program.

Furthermore, an output device controller 205 carries out a display of a command selection screen, edit results or the like and an audio output of edit results or the like via a display 206 and a speaker 208, and an editor is allowed to use an input unit, such as a mouse 200 or a keyboard 207 according to the above-mentioned display or audio output to cause the animation editing device to execute an editing command for the animation editing management unit 101, the time line editing unit 102, the space plane editing unit 1401, the tag editing unit 1402, and the tag arranging unit 105 via an input device controller 201. In addition, the storage medium 106 can be constructed on a storage area of a hard disk 203 or a memory 204, which is normally built in the above-mentioned computer, or on a memory medium in an external storage device.

Next, the operation of the animation editing device will be explained.

Figure 22:
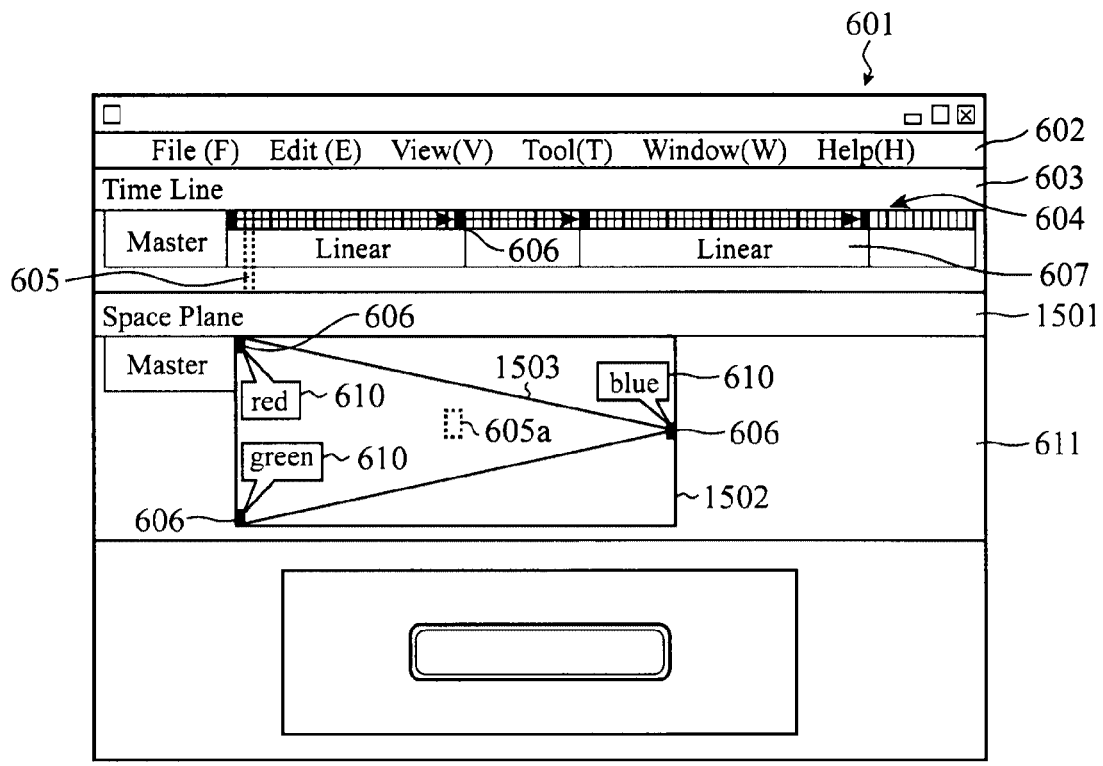
FIG. 22 is a view showing a main operation screen of the animation editing device in accordance with Embodiment 3.

FIG. 22 is a view showing a main operation screen of the animation editing device in accordance with Embodiment 3. As shown in FIG. 22, information about the space plane 1502 is displayed in a space plane display area 1501. A space plane 1502 shows the state of the space plane of the animation data currently being edited.

Key frames are arranged at the positions of key frame displays 606 on the space plane 1502. A triangular area which is enclosed by three straight lines each connecting between two of the key frame displays 606 on the space plane 1502 is an interpolation enable area 1503 between the key frames. In the example of FIG. 22, the display colors of parts in the key frames are set to red, blue and green, respectively.

The space plane editing unit 1401 carries out a linear interpolation of the display color of the part in a frame in the interpolation enable area 1503 by using the display color of the part in each key frame. As a result, a frame 605a positioned at the center of the interpolation enable area 1503, which is specified by a display position cursor 605, has a display color which is gray into which red, blue and green are mixed linearly.

In the example shown in FIG. 22, the tag editing unit 1402 arranges a tag 610 having a tag name of "red", a tag 610 having a tag name of "green", and a tag 610 having a tag name of "blue" in the key frames on the space plane 1502, respectively. Tags can be arranged also in the interpolation enable area 1503.

Figure 23:
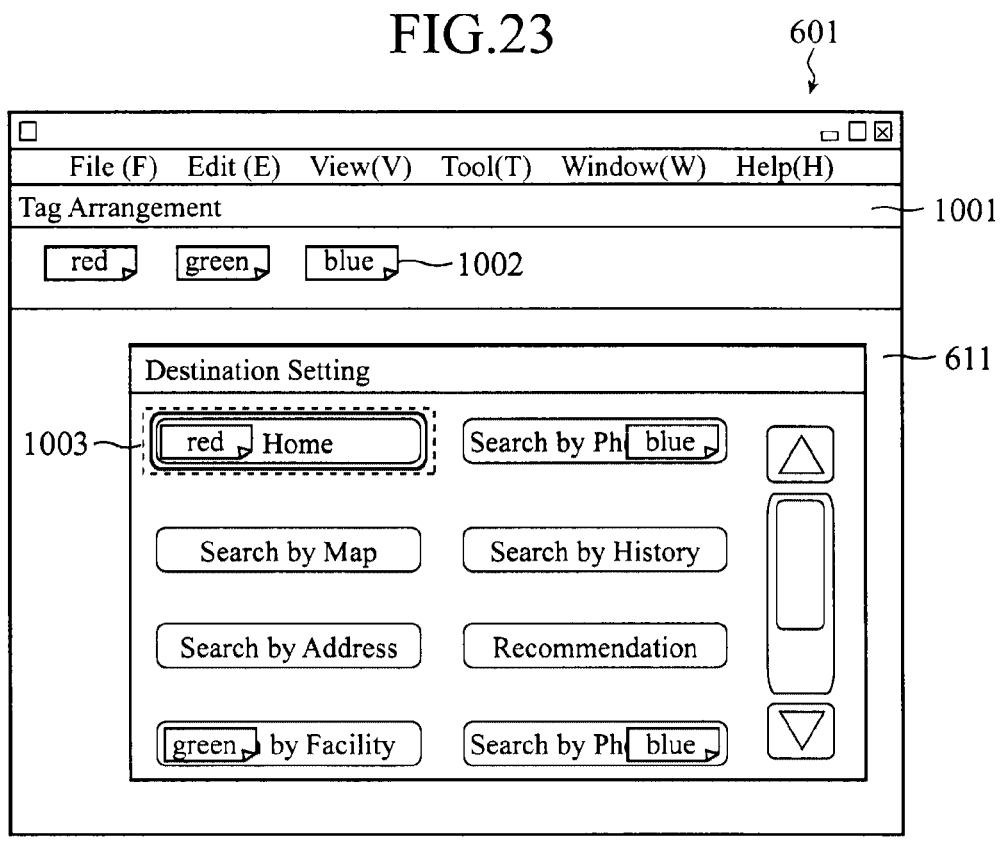
FIG. 23 is a view showing a tag arrangement screen of the animation editing device in accordance with the Embodiment 3.

FIG. 23 is a view showing a tag arrangement screen of the animation editing device in accordance with Embodiment 3, and shows a case in which the tags are arranged in a frame display area 611 of a main operation screen 601. By two-dimensionally arranging the tags in the frame display area 611 and calculating information about the distance between each of the tags and the part, the animation editing device determines the display position of the part on the space plane 1502 shown in FIG. 22 from this distance information.

In the example shown in FIG. 23, by using three distances including the distance between a cursor part at the position of a "home" which is highlighted by a display 1003 of a selected choice and a tag indicator having a tag name of "red" arranged in the key frames, the distance between the cursor part and a tag indicator having a tag name of "blue" arranged in the key frames which is nearer to the cursor, and the distance between the cursor part and a tag indicator having a tag name of "green" arranged in the key frames, the animation editing device determines the display position of the cursor part on the space plane 1502 shown in FIG. 22 to be the position having a ratio which is the same as the ratio among the above-mentioned three distances.

As mentioned above, the animation editing device in accordance with this Embodiment 3 includes the data storage unit 106 for storing the animation data 107 including the time line data 108 in which a layout of key frames, arrangement of tags in each of the key frames and information about interpolation of frames between the key frames are defined on the basis of the time line, and the space plane data 109a in which a layout of the key frames, arrangement of tags in each of the key frames and information about interpolation of frames between the key frames are defined on the basis of the space plane, the space plane data having the tag data 113 for defining the tags arranged on the space plane, and displays the time line and the space plane which are defined by the time line data 108 and the space plane data 109a included in the animation data 107 to be edited read from the data storage unit 106, and the contents of the frames based on the time line and the space plane, accepts an editing command, and carries out one of time line editing, space plane editing, tag editing, and tag arrangement according to an editing command which is inputted as a response to the displayed information. can edit the animation while easily bringing any animation image position on the display screen into correspondence with the display state at the position, the animation editing device can provide an improvement in the animation editing efficiency. Because the animation editing device in accordance with this Embodiment 3 is constructed in this way, the animation editing device can easily edit the interpolation of frames between key frames on the two dimensional plane, and can also bring the position of each part on the display screen into correspondence directly with its display state defined on the space plane, the animation editing device can further increase the efficiency of the animation editing.

An animation playback device which plays back the animation edited by the animation editing device in accordance with Embodiment 3 is provided with an animation execution management unit, a time line executing unit, a space plane executing unit, and a tag-to-part distance calculating unit (distance calculating unit), in addition with the storage medium 106 of FIG. 21 shown in above-mentioned Embodiment 3 and the structure of the animation data 107 stored in the storage medium.

While the animation execution management unit reads the animation data 107 from the storage medium 106, the animation execution management unit executes the animation data to display an animation which the animation execution management unit has acquired as the result of the execution on a screen, and present the animation for the user. The animation execution management unit uses output devices (not shown), such as a display and a speaker, to output the results of the execution.

The time line executing unit creates a key frame, creates apart in the key frame, and carries out interpolation of frames between key frames on the basis of information about the time line to create an animation image which is successively displayed at run time. The space plane executing unit creates a key frame, creates a part in the key frame, and carries out interpolation of frames between key frames on the basis of information about the space plane to create an animation image which is successively displayed at run time.

The tag-to-part distance calculating unit calculates distance information about the distance between each tag and a part which are arranged in each key frame according to a positional relationship between each tag and the part to determine the display position of the part (the frame in which the part is displayed) on the space plane from the distance information. The space plane executing unit creates an animation image in which parts are arranged on the screen according to their display positions on the space plane which are determined by the tag-to-part distance calculating unit 1104.

Furthermore, this animation playback device is constructed on a computer as shown in FIG. 2 in above-mentioned Embodiment 1. More specifically, the animation execution management unit, the time line executing unit, the space plane executing unit, and the tag-to-part distance calculating unit can be implemented on the computer as concrete units in each of which hardware and software work in cooperation with each other by causing the above-mentioned computer to read a program for animation playback according to the scope of the present invention and then causing a CPU 202 to execute the program.

Above-mentioned Embodiments 1 to 3 show examples of the structure in accordance with the present invention, any structure equipped with similar units can provide the same advantages even though the structure is another combination of similar units.

Industrial Applicability

Because the animation editing device in accordance with the present invention enables the user to edit an animation while easily bringing part positions on the screen into correspondence with the display states of the parts and enables the user to easily understand the correspondence between the positions and the display states also from the edit results, the animation editing device in accordance with the present invention is suitable for creation of a user interface using an animation, and a movie content.

The invention claimed is:

1. An animation editing device which edits an animation according to animation data consisting of data about each of frames which construct said animation, said animation editing device comprising:
   a data storage unit that stores said animation data including space line data in which a layout of key frames which serve as references of said animation, arrangement of tags in each of said key frames and information about interpolation of frames between said key frames are defined on a basis of a space line for showing a relative positional relationship between a display position of each of animation parts and a reference position shown by a tag by mapping the relative positional relationship onto a one-dimensional straight line, said space line data having tag data for defining the tags arranged on said space line;
   a space line editing unit that creates a key frame to be arranged on said space line, arranging the key frame on said space line, and setting information about interpolation of frames between key frames on said space line for the space line data read from said data storage unit according to an inputted editing command;
   a tag editing unit that sets a tag at a position on the space line defined by the space line data read from said data storage unit according to an inputted editing command, said position being shown by said editing command;
   a tag arranging unit that arranges a tag at a position of a key frame defined by said animation data according to an inputted editing command, said position being shown by said editing command; and
   an animation editing management unit that provides the space line which is defined by the space line data included in the animation data to be edited read from said data storage unit, and contents of the frames based on said space line, and accepting an editing command, and for causing said space line editing unit, said tag editing unit, and said tag arranging unit to perform an editing process according to an editing command which is inputted as a response to said provided information to provide an animation edit result.

2. The animation editing device according to claim 1, wherein said data storage unit includes time line data in which a layout of the key frames which serve as references of said animation, arrangement of tags in each of said key frames and information about interpolation of frames between said key frames are defined on a basis of a time line showing temporal display order of frames, and said animation editing device includes a time line editing unit that creates a key frame to be arranged on said time line, arranging the key frame on said time line, and setting information about interpolation of frames between key frames on said time line for the time line data read from said data storage unit according to an inputted editing command, and wherein
   said animation editing management unit provides the time line and the space line which are defined by the time line data and the space line data included in the animation data to be edited read from said data storage unit, and contents of the frames based on said time line and said space line, accepts an editing command, and causes said time line editing unit, said space line editing unit, said tag editing unit, and said tag arranging unit to perform an editing process according to an editing command which is inputted as a response to said provided information to provide an animation edit result.

3. An animation editing device which edits an animation according to animation data consisting of data about each of frames which construct said animation, said animation editing device comprising:
   a data storage unit that stores said animation data including space plane data in which a layout of key frames which serve as references of said animation, arrangement of tags in each of said key frames and information about interpolation of frames between said key frames are defined on a basis of a space plane for showing a relative positional relationship between a display position of each of animation parts and a reference position shown by a tag by mapping the relative positional relationship onto a two-dimensional plane, said space plane data having tag data for defining the tags arranged on said space plane;
   a space plane editing unit that creates a key frame to be arranged on said space plane, arranging the key frame on said space plane, and setting information about interpolation of frames between key frames in said space plane for the space plane data read from said data storage unit according to an inputted editing command;
   a tag editing unit that sets a tag at a position on the space plane defined by the space plane data read from said data storage unit according to an inputted editing command, said position being shown by said editing command;
   a tag arranging unit that sets a tag at a position of a key frame defined by said animation data according to an inputted editing command, said position being shown by said editing command; and
   an animation editing management unit that provides the space plane which is defined by the space plane data included in the animation data to be edited read from said data storage unit, and contents of the frames based on said space plane, and accepting an editing command, and for causing said space plane editing unit, said tag editing unit, and said tag arranging unit to perform an editing process according to an editing command which is inputted as a response to said provided information to provide an animation edit result.

4. The animation editing device according to claim 3, wherein said data storage unit includes time line data in which a layout of the key frames which serve as references of said animation, arrangement of tags in each of said key frames and information about interpolation of frames between said key frames are defined on a basis of a time line showing temporal display order of frames, and said animation editing device includes a time line editing unit that creates a key frame to be arranged on said time line, arranging the key frame on said time line, and setting information about interpolation of frames between key frames on said time line for the time line data read from said data storage unit according to an inputted editing command, and wherein said animation editing management unit provides the time line and the space plane which are defined by the time line data and the space plane data included in the animation data to be edited read from said data storage unit, and contents of the frames based on said time line and said space plane, accepts an editing command, and causes said time line editing unit, said space plane editing unit, said tag editing unit, and said tag arranging unit to perform an editing process according to an editing command which is inputted as a response to said provided information to provide an animation edit result.

5. An animation playback device which plays back animation data consisting of data about each of frames which construct an animation, said animation playback device comprising:
- a data storage unit that stores said animation data including space line data in which a layout of key frames which serve as references of said animation, arrangement of tags in each of said key frames and information about interpolation of frames between said key frames are defined on a basis of a space line for showing a relative positional relationship between a display position of each of animation parts and a reference position shown by a tag by mapping the relative positional relationship onto a one-dimensional straight line, said space line data having tag data for defining the tags arranged on said space line;
- a distance calculating unit that calculates a distance between a tag arranged in a frame and an animation part to determine a display position on said space line of said animation part, said display position corresponding to a positional relationship in said frame based on said distance;
- a space line executing unit that creates an animation image of the animation part from the animation data read from said data storage unit on a basis of a frame relationship defined by said space line data, said animation image corresponding to the display position on said space line which is determined by said distance calculating unit; and
- an animation execution management unit that inputs the animation data to be played back read from said data storage unit to said distance calculating unit, and said space line executing unit to cause them to create an animation image of said animation data to be played back.

6. The animation editing device according to claim 5, wherein said data storage unit includes time line data in which a layout of the key frames which serve as references of said animation, arrangement of tags in each of said key frames and information about interpolation of frames between said key frames are defined on a basis of a time line showing temporal display order of frames, and said animation editing device includes a time line executing unit that creates an animation image based on a frame relationship defined by said time line data from the animation data read from said data storage unit, and wherein said animation execution management unit inputs the animation data to be played back read from said data storage unit to said time line executing unit, said distance calculating unit, and said space line executing unit to cause them to create an animation image of said animation data to be played back.

7. An animation playback device which plays back animation data consisting of data about each of frames which construct an animation, said animation playback device comprising:
- a data storage unit that stores said animation data including space plane data in which a layout of key frames which serve as references of said animation, arrangement of tags in each of said key frames and information about interpolation of frames between said key frames are defined on a basis of a space plane for showing a relative positional relationship between a display position of each of animation parts and a reference position shown by a tag by mapping the relative positional relationship onto a two-dimensional plane, said space plane data having tag data for defining the tags arranged on said space plane;
- a distance calculating unit that calculates a distance between a tag arranged in a frame and an animation part to determine a display position on said space plane of said animation part, said display position corresponding to a positional relationship in said frame based on said distance;
- a space plane executing unit that creates an animation image of the animation part from the animation data read from said data storage unit on a basis of a frame relationship defined by said space plane data, said animation image corresponding to the display position on said space plane which is determined by said distance calculating unit; and
- an animation execution management unit that inputs the animation data to be played back read from said data storage unit to said distance calculating unit, and said space plane executing unit to cause them to create an animation image of said animation data to be played back.

8. The animation editing device according to claim 7, wherein said data storage unit includes time line data in which a layout of the key frames which serve as references of said animation, arrangement of tags in each of said key frames and information about interpolation of frames between said key frames are defined on a basis of a time line showing temporal display order of frames, and said animation editing device includes a time line executing unit that creates an animation image based on a frame relationship defined by said time line data from the animation data read from said data storage unit, and wherein said animation execution management unit inputs the animation data to be played back read from said data storage unit to said time line executing unit, said distance calculating unit, and said space plane executing unit to cause them to create an animation image of said animation data to be played back.

9. An animation editing method comprising:
- storing, by circuitry, contents of a frame based on a space line defined by space line data included in animation data, the space line showing a relative positional relationship between a display position of each of animation parts and a reference position shown by a tag by mapping the relative positional relationship onto a one-dimensional straight line, the space line data having tag data that defines the tags arranged on the space line;
- displaying, by the circuitry, the contents of the frame;
- accepting, by the circuitry an editing command;
- setting, by the circuitry, when the editing command is a command to define the tag on the space line, the tag having a specified name at a specified position on the space line; and
- creating and arranging, by the circuitry, when the editing command is a command to arrange the tag at the specified position on a key frame screen, the tag having the specified name at the specified position on the key frame screen.

10. An animation editing method comprising:
calculating, by circuitry, a distance between a tag arranged in a frame and an animation part from animation data including space line data in which a layout of key frames, arrangement of tags in each of said key frames and information about interpolation of frames between said key frames are defined on a basis of a space line, said space line data having tag data for defining the tags arranged on said space line to determine a display position on said space line of said animation part, said space line being a one-dimensional straight line, and said display position corresponding to a positional relationship in the frame based on said distance;
creating, by the circuitry, an animation image of the animation part corresponding to the display position on the space line which is determined from said animation data; and
storing, by the circuitry, the animation image.

* * * * *